United States Patent [19]
Feng

[11] Patent Number: 6,123,263
[45] Date of Patent: *Sep. 26, 2000

[54] HAND HELD DATAFORM READER HAVING STROBING ULTRAVIOLET LIGHT ILLUMINATION ASSEMBLY FOR READING FLUORESCENT DATAFORMS

[75] Inventor: Chen Feng, Bothell, Wash.

[73] Assignee: Meta Holdings Corporation, Akron, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/015,363

[22] Filed: Jan. 29, 1998

[51] Int. Cl.⁷ .................................................. G06K 7/10
[52] U.S. Cl. ...................................................... 235/462.42
[58] Field of Search ................... 235/462.41, 462.42, 235/462.43, 462.48, 462.44, 472.01, 462.04

[56] References Cited

U.S. PATENT DOCUMENTS

| | | | |
|---|---|---|---|
| 3,492,478 | 1/1970 | Smith | 250/271 |
| 3,500,047 | 3/1970 | Berry | 250/271 |
| 3,662,181 | 5/1972 | Hercher et al. | 235/462.04 |
| 3,663,813 | 5/1972 | Shaw | 235/468 X |
| 4,160,902 | 7/1979 | van Wijngaarden | 235/462.06 X |
| 4,166,540 | 9/1997 | Marshall | 209/555 |
| 4,180,204 | 12/1979 | Koenig et al. | 235/472.01 |
| 4,210,802 | 7/1980 | Sakai | 235/483 |
| 4,734,566 | 3/1988 | Senda et al. | 235/455 |
| 4,877,949 | 10/1989 | Danielson et al. | 235/462.42 |
| 4,889,367 | 12/1989 | Miller | 235/462.07 X |
| 4,983,817 | 1/1991 | Dolash et al. | 235/462.04 |
| 5,019,699 | 5/1991 | Koenck | 235/462.2 |
| 5,135,160 | 8/1992 | Tasaki | 235/462.42 |
| 5,184,005 | 2/1993 | Ukai et al. | 235/462.16 |
| 5,235,167 | 8/1993 | Dvorkis et al. | 235/462.21 |
| 5,293,238 | 3/1994 | Nakano et al. | 348/226 |
| 5,315,095 | 5/1994 | Marom et al. | 235/462.22 |
| 5,319,181 | 6/1994 | Shelhammer et al. | 235/462.09 |
| 5,359,185 | 10/1994 | Hanson | 235/454 |
| 5,401,960 | 3/1995 | Fisun et al. | 235/468 X |
| 5,408,084 | 4/1995 | Brandorff et al. | 235/462.42 |
| 5,468,950 | 11/1995 | Hanson | 235/454 |
| 5,502,304 | 3/1996 | Berson et al. | 235/468 X |
| 5,525,798 | 6/1996 | Berson et al. | 235/468 X |
| 5,532,104 | 7/1996 | Goto | 430/139 |
| 5,532,467 | 7/1996 | Roustaei | 235/462.42 |
| 5,642,442 | 6/1997 | Morton et al. | 382/287 |
| 5,717,195 | 2/1998 | Feng et al. | 235/470 |
| 5,783,811 | 7/1998 | Feng et al. | 235/462.42 |
| 5,793,033 | 8/1998 | Feng et al. | 235/472.01 |
| 5,861,618 | 1/1999 | Berson | 235/468 |
| 5,920,061 | 7/1999 | Feng | 235/462.42 |

FOREIGN PATENT DOCUMENTS 60-129891  11/1985  Japan .

*Primary Examiner*—Karl D. Frech
*Assistant Examiner*—Diane I. Lee
*Attorney, Agent, or Firm*—Watts, Hoffmann, Fisher & Heinke, Co., LPA

[57] ABSTRACT

A portable data collection device having a modular imaging-based dataform reader. The dataform reader includes a two dimensional imaging assembly adapted to image and decode a dataform printed using ink that fluoresces when illuminated by ultraviolet light. The imaging assembly includes a two dimensional photosensor array and is actuatable to generate a signal representative of reflected illumination from a target area of the imaging assembly and further includes an illumination assembly having a strobing ultraviolet light source. The illumination assembly includes a pair of flash tube strobe lights which have their output illumination filtered through respective ultraviolet filter thereby permitting only illumination in the ultraviolet range to exit the dataform reader and illuminate the imaging target area. The high intensity, strobing light of the ultraviolet light source permits a reduced exposure period. A targeting illumination assembly is also provided to aid in aiming the device at a target dataform. The targeting illumination assembly and illumination assembly are alternately energized to reduce reflected glare. Fluorescence from the dataform is focused by an optic assembly onto the photosensor array forming an image of the dataform. Image processing circuitry is provided for processing and decoding the image of the dataform.

20 Claims, 15 Drawing Sheets

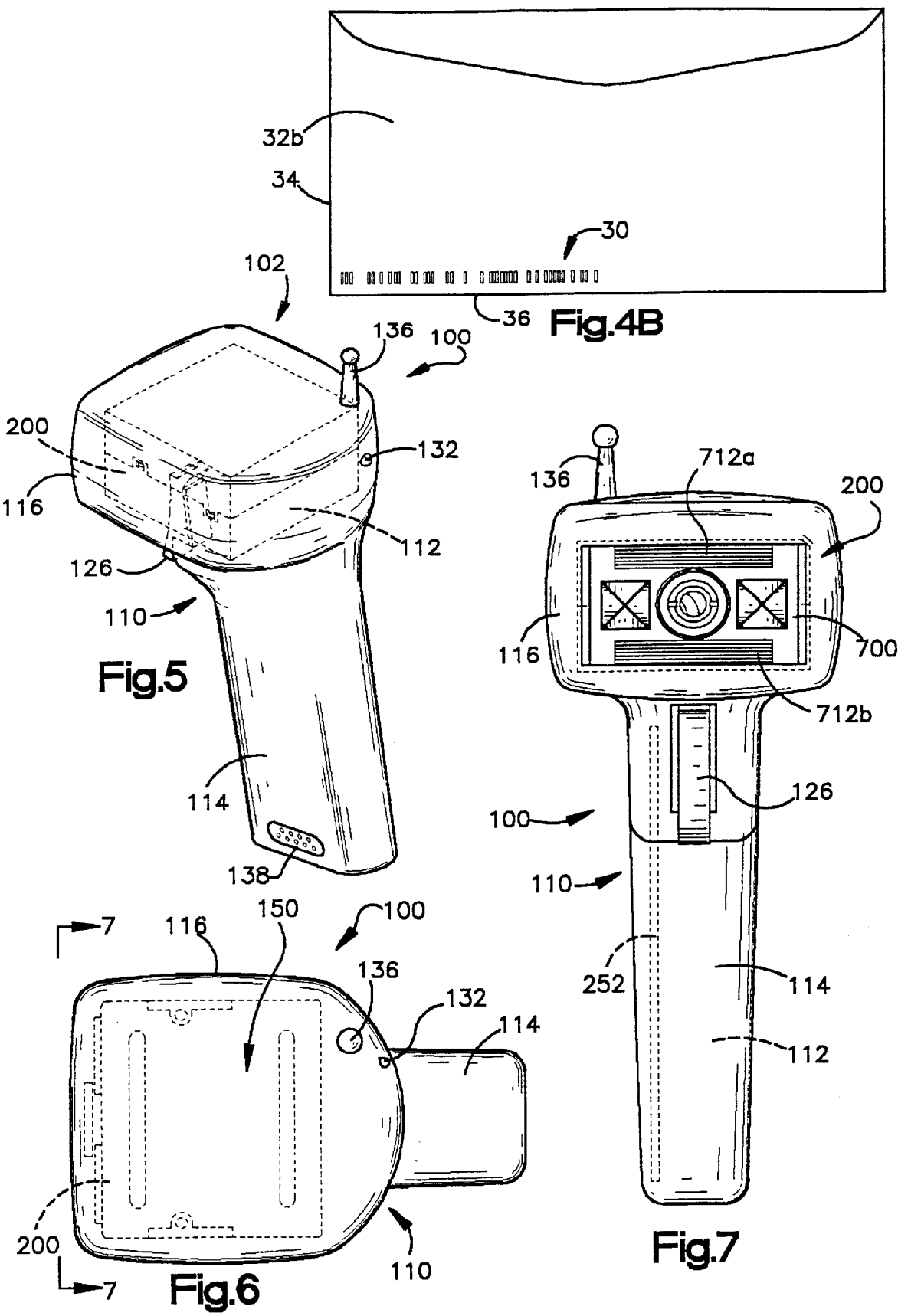

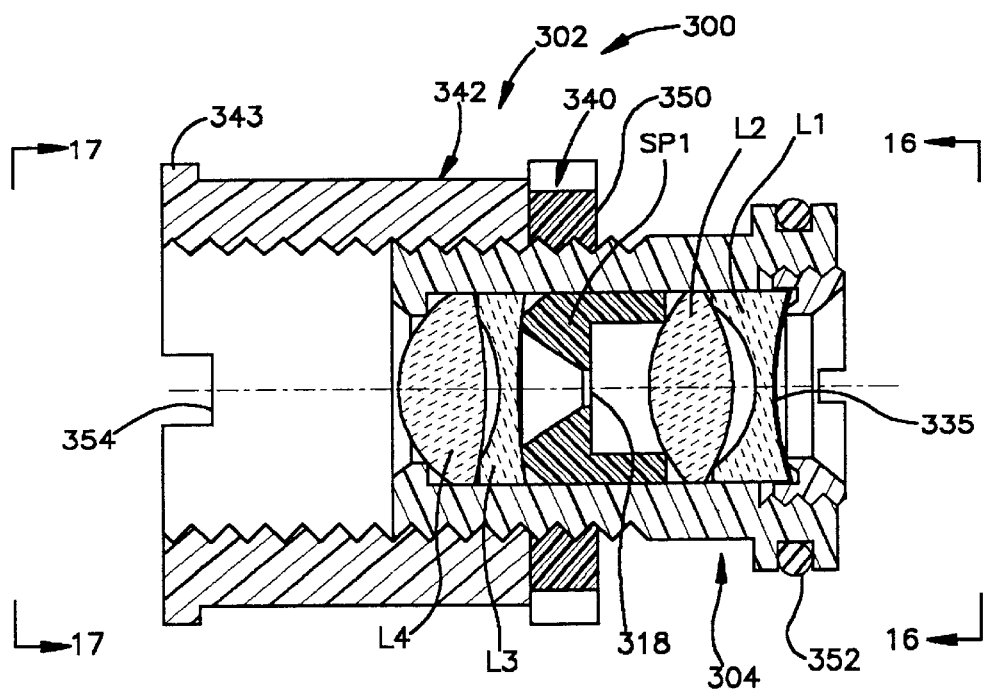
Fig.15
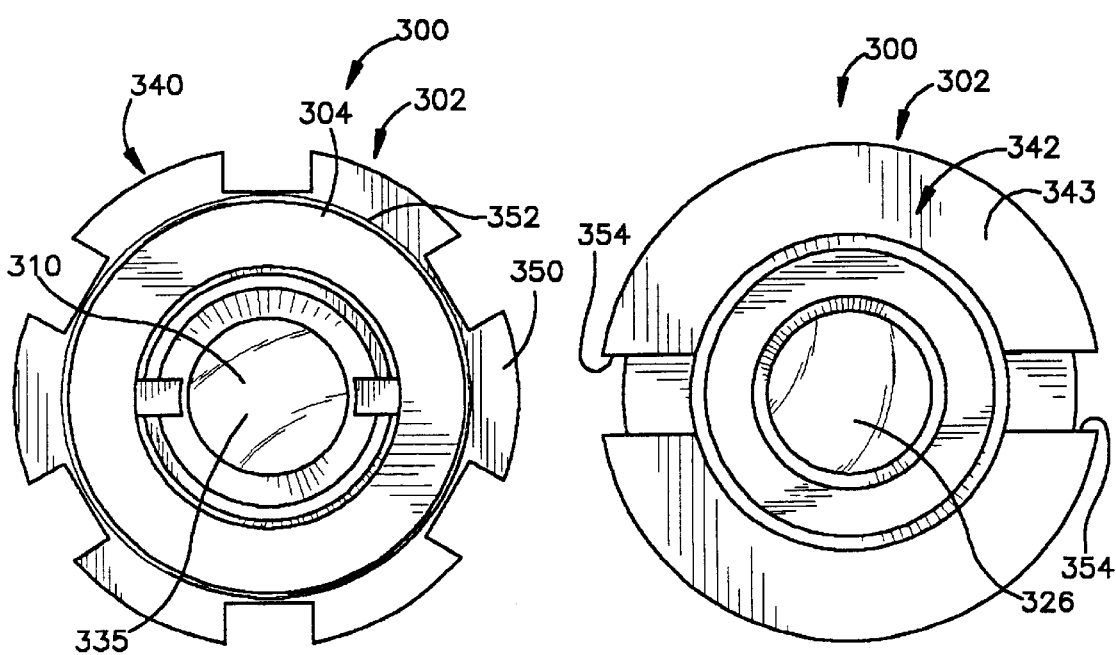
Fig.16
Fig.17

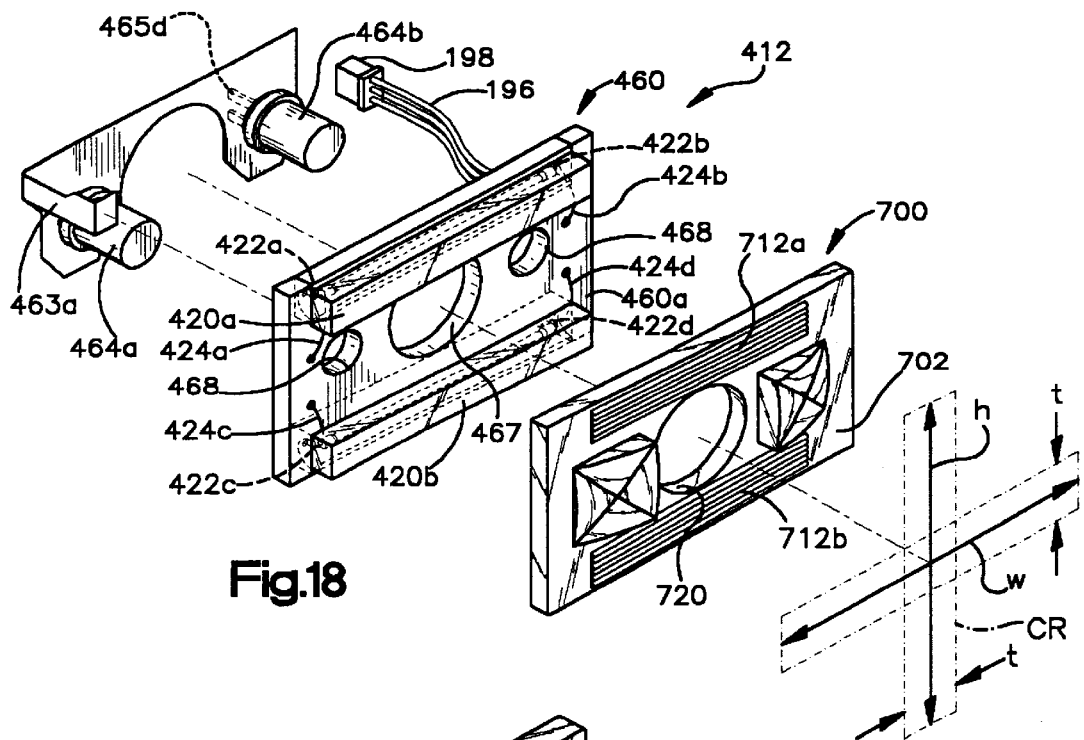
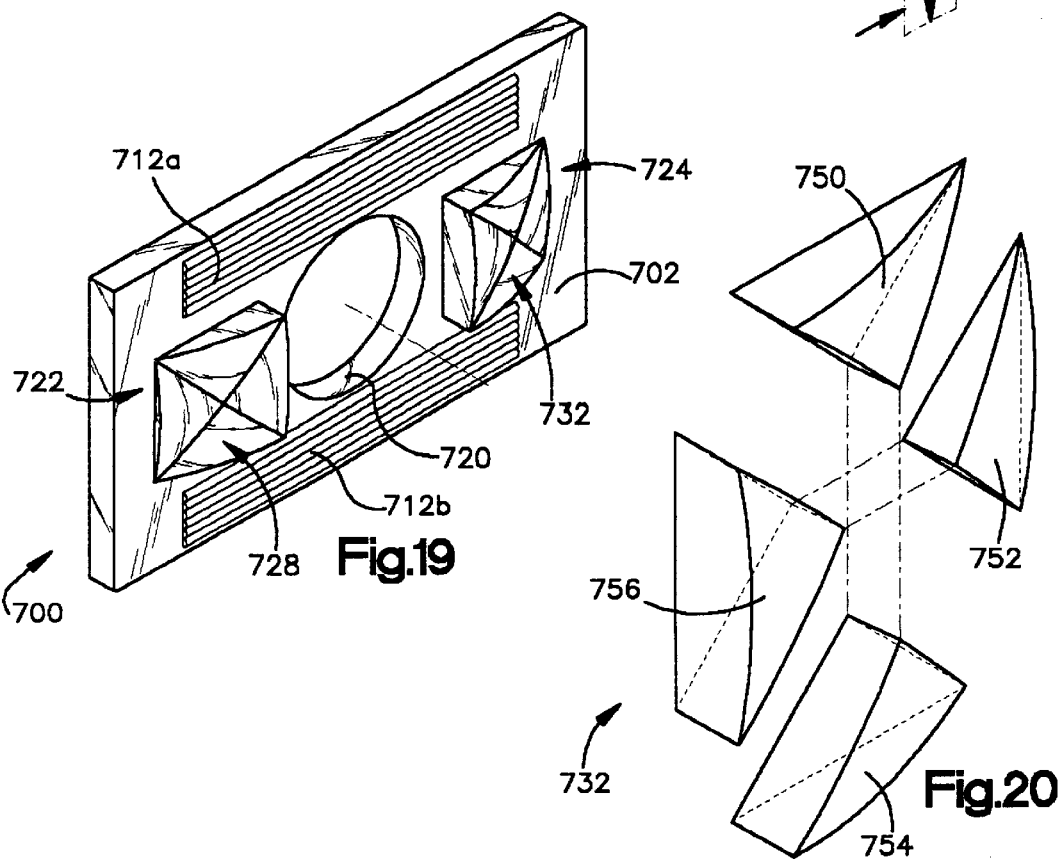

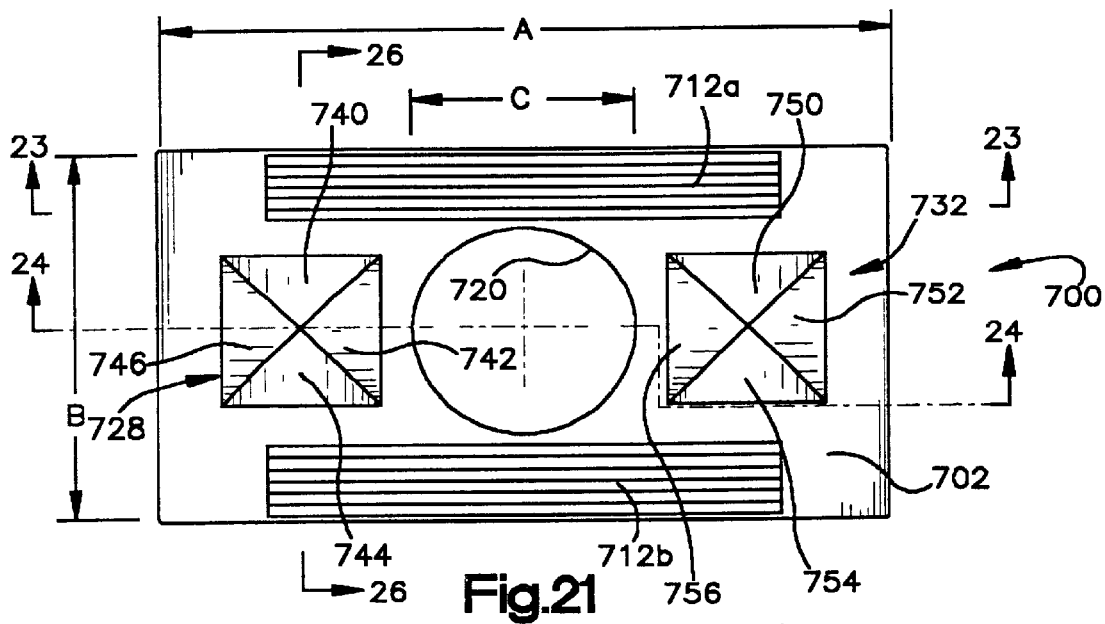
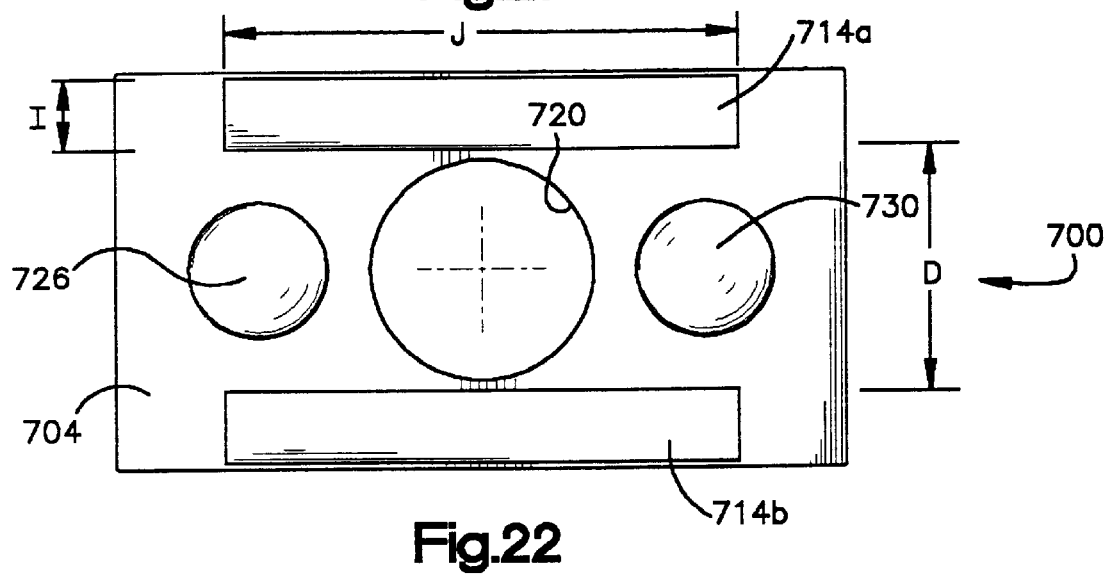
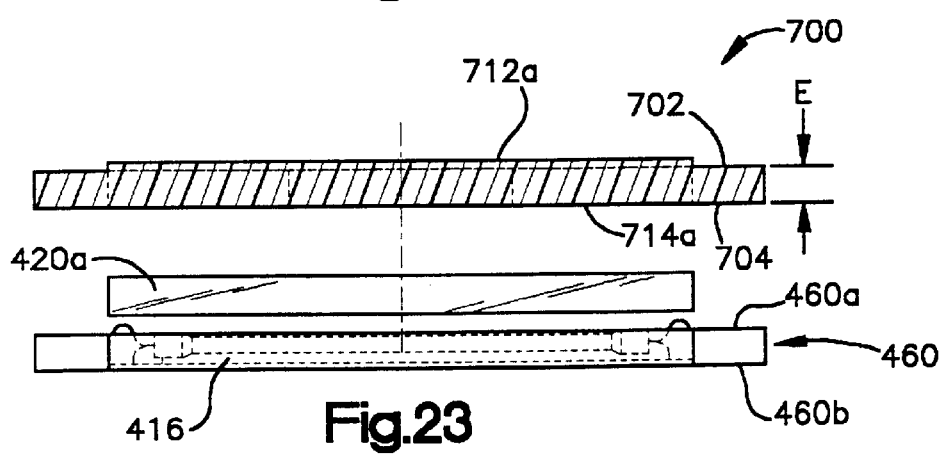

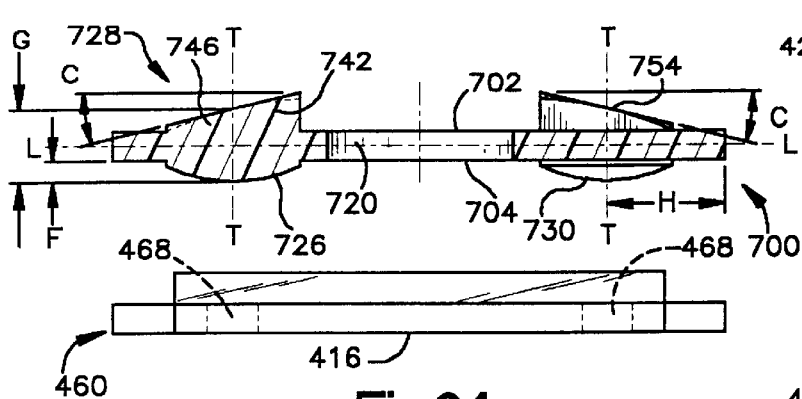
Fig.24
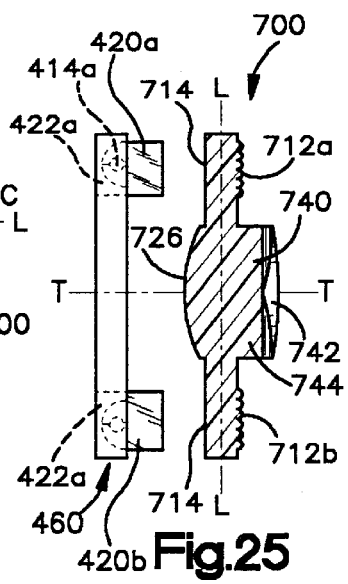
Fig.25
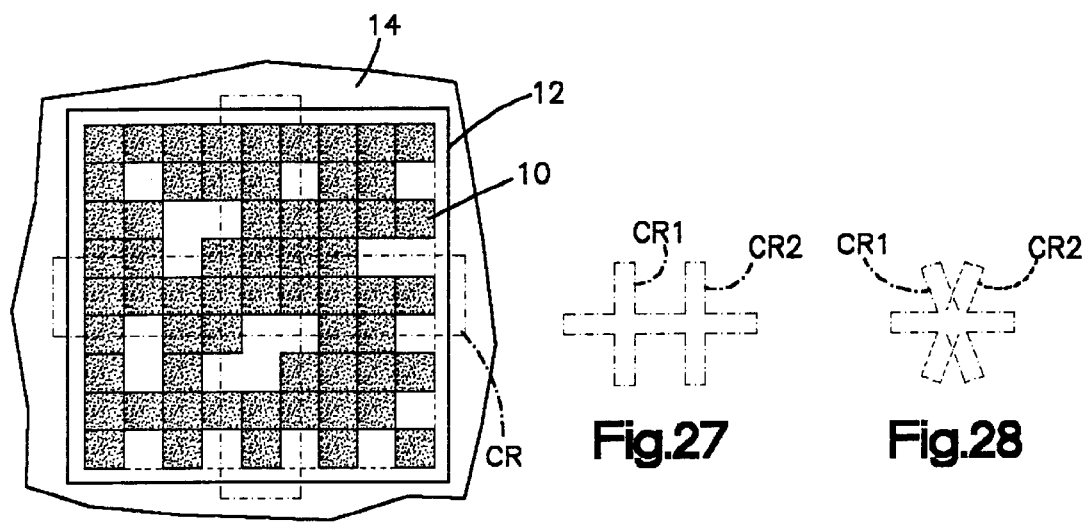
Fig.26
Fig.27
Fig.28

HAND HELD DATAFORM READER HAVING STROBING ULTRAVIOLET LIGHT ILLUMINATION ASSEMBLY FOR READING FLUORESCENT DATAFORMS

FIELD OF THE INVENTION

The present invention relates to a portable data collection device including an imaging-based dataform reader and, more particularly, to a portable data collection device including an imaging-based dataform reader utilizing a strobing flash tube ultraviolet light illumination assembly to image and decode dataforms printed utilizing an ink that fluoresces when illuminated by ultraviolet light.

BACKGROUND OF THE INVENTION

Portable data collection devices are widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, etc. for inventory control, tracking, production control and expediting, quality assurance and other purposes. Various bar code dataform readers have been proposed for portable data collection devices including laser scanners and one dimensional charge coupled device (CCD) imaging-based assemblies, both of which are capable of reading one dimensional bar code dataforms, that is, bar codes consisting of a single row of contrasting black bars and white spaces of varying widths. Both laser scanners and one dimensional CCD imaging assemblies are also capable of reading a "stacked" two dimensional bar code dataform, such as PDF417, which is comprised of a plurality of adjacent rows of bar code data. The stacked 2D bar code PDF417 includes row indicator patterns utilized by the dataform reader for vertical synchronization to permit reading successive rows of bar code data.

A two dimensional imaging dataform reader has been proposed in U.S. Pat. No. 5,702,059, issued Dec. 30, 1997 and entitled "Extended Working Range Dataform Reader Including Fuzzy Logic Image Control Circuitry." The 2D dataform reader disclosed in U.S. Pat. No. 5,702,059, which is assigned to the assignee of the present application, includes an imaging assembly having a two dimensional array of photosensors adapted to read one dimensional bar code dataforms and two dimensional bar code dataforms (e.g., PDF417, SuperCode, etc.) with vertical synchronization row indicator patterns as well as matrix dataforms (e.g., MaxiCode, DataMatrix, etc.) which do not include vertical synchronization patterns. The individual photosensors correspond to image picture elements or pixels of the resulting captured image. The photosensors accumulate charge during an exposure period and are read out (discharged) at the end of the exposure period. The two dimensional dataform reader disclosed in U.S. Pat. No. 5,702,059 utilizes an open loop feedback control system including fuzzy logic circuitry to determine proper exposure time and gain parameters for a camera assembly of the imaging assembly. U.S. Pat. No. 5,702,059 is incorporated in its entirety herein by reference.

A recent trend in dataform technology is to print dataforms using ink that fluoresces when illuminated by radiation having of a particular wavelength or range of wavelengths. When the fluorescent ink is illuminated by radiation of the appropriate wavelength, the ink fluoresces or emits light or radiation of a different wavelength. For example, the United States Postal Service imprints an identification (ID) tag bar code dataform on each piece of mail using an ink that fluoresces when illuminated by radiation in the ultraviolet range of the electromagnetic spectrum. Ultraviolet radiation or illumination includes the portion of the electromagnetic spectrum between visible violet light, having a wavelength of about 380 nanometers (nm.) (or 3800 Angstroms) and the X-ray region of the electromagnetic spectrum at about 10 nm. (or 100 Angstrom). The Postal Service ID tag bar code dataform imprinted on each piece of mail includes the following fields of data: mail class; machine identification; day of month; time of day in ½ hour increments; and mailpiece serial number (sequence number). For ease of reference, ink that fluoresces when illuminated by ultraviolet radiation will be referred to as ultraviolet light active fluorescent ink. To read a dataform imprinted utilizing an ultraviolet light active fluorescent ink, it is necessary to have a dataform reader that can image a pattern of fluorescent illumination emitted by such a dataform.

What is need is a dataform reader capable of reading a dataform printed utilizing an ultraviolet light active fluorescent ink. Further, what is needed is a dataform reader capable of reading a dataform printed using an ultraviolet light active fluorescent ink wherein the dataform reader is relatively inexpensive and uses modified version of an imaging assembly known in the art. Additionally, what is needed is a dataform reader capable of imaging such a dataform such that the captured image has sufficient clarity and contrast for image processing and decoding.

SUMMARY OF THE INVENTION

In accordance with the present invention, a portable data collection device is provided with a two dimensional imaging assembly including a modular board camera adapted to read, that is, to image and decode, one and two dimensional bar code dataforms and matrix dataforms printed in ultraviolet light active fluorescent ink. The dataform reader is provided with a targeting and illumination assembly. The targeting and illumination assembly includes a targeting illumination assembly providing illumination in the visible range of the electromagnetic spectrum, e.g., radiation having a wavelength range centered at about 660 nanometers (nm.) or 6600 Angstrom, to aid an operator in aiming the device at a target dataform.

The targeting and illumination assembly also includes an illumination assembly providing illumination in a range of the electromagnetic spectrum suitable to cause the ultraviolet light active fluorescent ink of the target dataform to fluoresce. A flash tube strobing illumination source is focused through an ultraviolet light filter to provide high intensity, strobing illumination in the ultraviolet range of the electromagnetic spectrum, e.g., radiation having a wavelength range centered at about 380 nm. (3800 Angstrom). The rate of strobing of the flash tube is up to 5 cycles/second. The cycle time corresponding to the 5 flashes/second strobing rate is 0.2 second. During each strobing cycle, the time that the flash tube is actually "on" or energized is very short, approximately 500 microseconds ($\mu$sec.) or 0.5 milliseconds (msec.) during the strobing cycle, that is, for a strobing cycle of 0.2 seconds, the flash tube's duty cycle (percentage of time during strobing cycle the source is energized) is only about 0.25% ((500 $\mu$sec/0.2 sec.)×100).

A dataform printed in ultraviolet light active fluorescent pigment or ink is printed on a substrate in a dataform area. The dataform area may be a label which is affixed to a product or a product's packaging. In such a case, the dataform area substrate on which the dataform is printed would be the label material. In other cases the dataform may be imprinted directly on an area of the product or the product's packaging. In these cases, the dataform area substrate would be the portion of the product or product packaging where the dataform is printed. The dataform is printed on substrate in the dataform area using ultraviolet light active fluorescent ink for the printed or "dark" cell portions of the dataform. The ultraviolet light active fluorescent ink that emits radiation or fluoresces upon being illuminated by ultraviolet light. When ultraviolet active ink fluoresces, it emits lights in the visible spectrum, that is, radiation having wavelengths ranging from about 380 nm. to 780 nm. (3800 to 7800 Angstrom).

The imaging assembly of the present invention includes a modular board camera assembly having a two dimensional photosensor array and an optic assembly for focusing an image of the target area onto the photosensor array and the targeting and illumination assembly. In the preferred embodiment, the modular board camera assembly includes board camera circuitry generating an analog composite video signal. The two dimensional photosensor array is a charge coupled device (CCD) comprised of a two dimensional matrix of photosensors. The composite analog video signal generated by the modular board camera assembly represents successive image frames of the imaging assembly target area. The composite video signal is converted by signal processing circuitry to a stream of eight bit digital gray scale values.

Upon instituting a dataform reading session, the targeting illumination assembly and the illumination assembly are alternately energized to enable the operator to aim the device and simultaneously capture image frames of the target area wherein the target area is uniformly illuminated and does not include "hot spots" of illumination in the target area caused by the narrowly focused targeting illumination. The ultraviolet light causes the ultraviolet light active ink portions of the dataform to fluoresce and emit visible illumination. This illumination pattern resulting from the fluorescence corresponds to a "negative" of the pattern of the dataform, that is, the darker inked areas or cells of the target dataform are imaged as light or white colored areas, while the lighter noninked areas or cells of the target dataform are imaged as dark areas. After appropriate filtering, the illumination pattern of the target dataform is focused onto the photosensor array.

The exposure period of the photosensor array is set to match the energization time of the flash tube illumination assembly, namely 500 μsec. This is shorter than conventional exposure periods and is enabled by the high intensity illumination provided by the flash tube illumination assembly. The high intensity ultraviolet lighting of the illumination assembly and the shortened exposure period advantageously improves image quality and reduces the smearing effect of operator hand jittering. The alternate energization of the targeting illumination assembly and the illumination assembly reduces reflected glare from the target dataform and label. Image frames without reflected targeting illumination are generated and decoding is attempted on such non-distorted image frames.

A portion of the set of gray scale values corresponding to the first captured image frame is converted by binarization and zoning circuitry into a set of binary (0,1) values in accord with a binarization algorithm. Working from a center of the image area outwardly, the circuitry identifies the binary values corresponding to the imaged ultraviolet light active light target dataform. The binary values corresponding to the dataform are operated on by cell extraction circuitry. The cell extraction circuitry generates cell extraction values which correspond to an image of the dataform area. Decoding circuitry then operates on the cell extraction values to decode the target dataform. Upon successful imaging and decoding of a captured image frame having an image of the dataform, the targeting and illumination assembly is deenergized.

These and other objects, features and advantages of the invention will become better understood from the detailed description of the preferred embodiments of the invention which are described in conjunction with the accompanying drawings.

BRIEF DESCRIPTION OF THE DRAWINGS

FIG. 4B is a schematic representation of a back side of the envelope of FIG. 4A and including a US Postal Service ID tag bar code dataform printed with ultraviolet light active ink on an envelope;

FIG. 5 is a perspective view of the portable data collection device of the present invention having a strobing ultraviolet light source illumination assembly;

FIG. 6 is a top view of the portable data collection device of FIG. 1;

FIG. 7 is a front elevation view of the portable data collection device of FIG. 1 as seen from a plane indicated by the line 7—7 in FIG. 6;

FIG. 15 is a view, partially in side elevation and partially in section of the optic assembly of the modular camera assembly;

FIG. 16 is a front elevation view of the optic assembly of the modular camera assembly as seen from a plane indicated by the line 16—16 in FIG. 15;

FIG. 17 is a rear elevation view of the optic assembly of the modular camera assembly as seen from a plane indicated by the line 17—17 in FIG. 15;

FIG. 18 is an exploded perspective view of a targeting and illumination assembly of the modular camera assembly of the imaging assembly of the present invention;

FIG. 19 is a perspective view of a lens array or front panel of the illumination assembly of FIG. 18;

FIG. 20 is an exploded perspective view of a targeting optics of the front panel of FIG. 19;

FIG. 21 is a front elevation view of the front panel of FIG. 19;

FIG. 22 is a back elevation view of the front panel of FIG. 19;

FIG. 23 is a sectional view of the front panel of FIG. 32 as seen from a plane indicated by the line 23—23 in FIG. 21;

FIG. 24 is a sectional view of the front panel of FIG. 19 as seen from a plane indicated by the line 24—24 in FIG. 21;

FIG. 25 is a sectional view of the front panel of FIG. 19 as seen from a plane indicated by the line 25—25 in FIG. 21;

FIG. 26 is a representation of a crosshair illumination pattern generated by the illumination assembly of FIG. 18 superimposed on a target two dimensional bar code dataform;

FIG. 27 is a representation of a separation of crosshair illumination patterns of two targeting optics of the illumination assembly of FIG. 18 caused by imaging with the portable data collection device at a distance from a target object significantly different than a best focus position of the optic assembly of the device;

FIG. 28 is a representation of an angular shift of crosshair illumination patterns of two targeting optics of the illumination assembly of FIG. 18 caused by imaging with the portable data collection device tilted such that the front panel is not substantially parallel to a surface of a target object;

DETAILED DESCRIPTION

Ultraviolet Light Active Ink Dataforms

Figure 1:
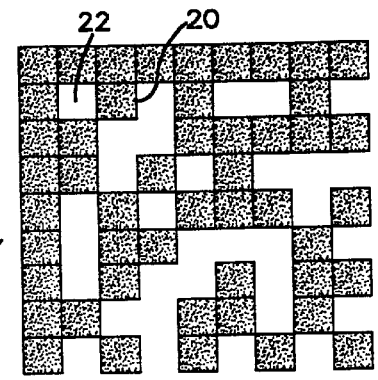
FIG. 1 is a schematic representation of a two dimensional matrix dataform printed with an ultraviolet light active ink.
Figure 2:
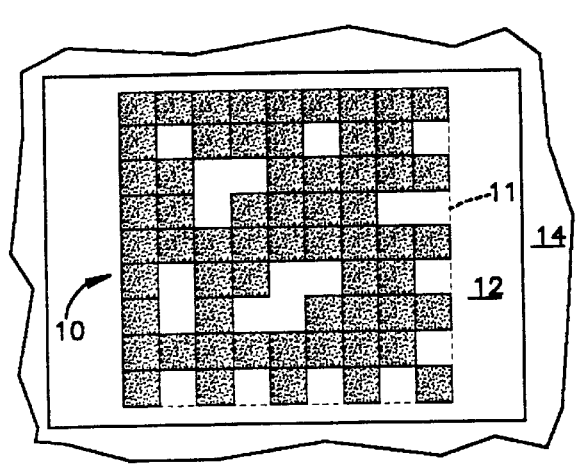
FIG. 2 is a schematic representation of the matrix dataform of FIG. 1 imprinted on a label and applied to a product's packaging.

Turning to the drawings, a dataform 10 printed using ultraviolet light active ink is shown schematically in FIG. 1. The dataform 10 is printed on a dataform area 11 (outlined in dashed line in FIG. 2) of a white or light colored label 12. Preferably, an opposite side of the label 12 includes an adhesive facilitating attachment of the label 12 to a product or a product's packaging 14. The dataform 10 is defined by a square matrix of 9 by 9 cells or areas, each cell being square in shape. The dataform 10 is comprised of a pattern of inked and non-inked cells. The ink or pigment used to print the dataformn 10 is an ink that fluoresces or emits light in the visible spectrum when illuminated by radiation in the ultraviolet range of the electromagnetic spectrum. For convenience, such an ink will hereinafter be referred to as ultraviolet light active ink and the dataform 10 as an ultraviolet light active ink dataform.

The ultraviolet light active ink dataform 10 is a schematic representation of a DataMatix dataform. DataMatrix is a binary symbology of International Data Matrix, Inc. of Clearwater, Fla. and is described in U.S. Pat. No. 5,473,151 to Priddy et al. While a DataMatrix dataform is used to illustrate the principals set forth here of generating and reading ultraviolet light active ink dataforms, it should be appreciated that any dataform, i.e., one dimensional bar code dataforms such as Codabar, Code 39, Code 93, Code 128, Interleaved 2 of 5, UPC/EAN and U.S. Postal Service national identification (ID) tag; two dimensional bar code dataforms such as PDF417 and SuperCode; and matrix dataforms such as MaxiCode and DataMatrix are all amenable to being printed with ultraviolet light active ink and read with a portable data collection device of the present invention.

As noted above, the dataform 10 is comprised of a pattern of 9 by 9 square shaped cells which are either inked (shown as dark in color) 20 or non-inked (shown as light in color) 22 (FIG. 1). An inked cell 20 is generated by applying or imprinting a label area corresponding to the cell with an ultraviolet light active ink or pigment that fluoresces upon being exposed to ultraviolet radiation or light. A non-inked cell 22 results from an absence of ink applied to the cell.

An acceptable ultraviolet light active ink is product no. A109461 ink produced by UVP, Inc. of Upland Calif. 91786. The A109461 UVP ink has an excitation peak wavelength of 365 nanometers (nm.) (UV long) and an emission wavelength maximum at 500 nm. (green color emission). The ink fluoresces when the ink is excited by radiation or illumination having a wavelength of around 365 nm. and emits radiation or illumination having a range of wavelengths, the wavelengths of the emitted radiation being centered about a value of about 500 nm., which is in the visible radiation range. However, under typical home or office fluorescent lighting, this ink does not emit or fluoresce sufficient radiation to be visible to the unaided eye. Thus, to the naked eye, the ink is invisible.

Another acceptable ultraviolet active ink is product no. 16-5420 ink produced by VideoJet Corp. of Wood Gale, Ill. 60191-1073. This ink has an excitation wavelength range of 350–510 nm. and an emission wavelength range of about 580–605 nm. The 60191-1073 VideoJet ink emits sufficient radiation under normal home or office fluorescent lighting to be visible to the unaided eye, the ink appearing to be the color orange.

Figure 4A:
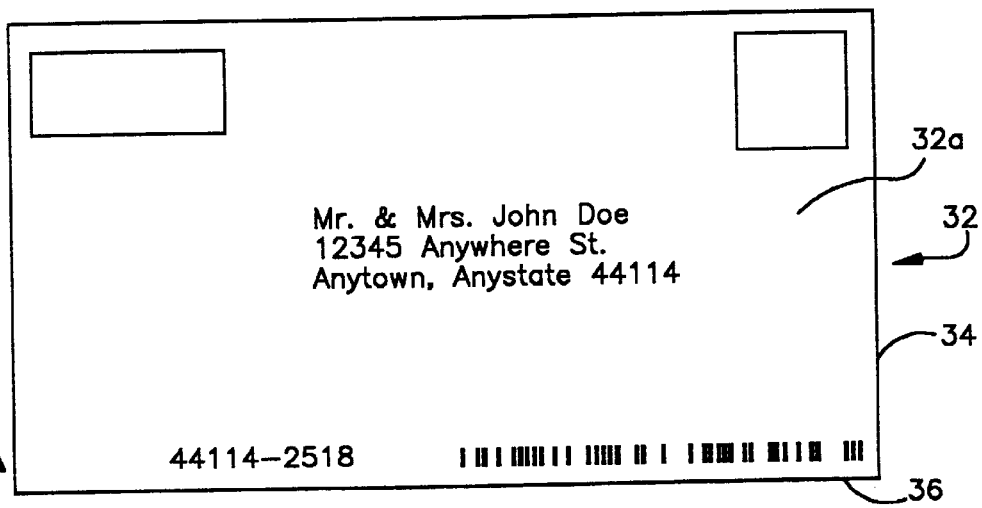
FIG. 4A is a schematic representation of a front side of an envelope.

FIGS. 4A and 4B are schematic representations of a mailpiece such as an envelope 32. FIG. 4A shows the front or address side 32a of the envelope 32 while FIG. 4B shows the reverse or back side 32b of the envelope 32. The back side 32b of the envelope 32 has a Postal Service ID tag bar code dataform 30 imprinted on it by the U.S. Postal Service.

The dataform 30 is printed using an ultraviolet light active ink. The dataform 30 is spaced from a leading edge 34 and a bottom edge 36 of the envelope 32 in accordance with Postal Service specifications. The information contained in the ID tag bar code dataform 30 is used in mail processing and tracking.

A format of the ID tag bar code dataform is shown in FIG. 4B at 40. According to US Postal Service regulations, the dataform format 40 has the following characteristics:

---

Ink: VideoJet Corp. product no. 16-5420 ultraviolet light active ink
Location of dataform:

Horizontal: 15 mm. +/− 1 mm. from the leading edge of the mailpiece
    Vertical: Top of bar code bars to be 13 mm. +/− 1 mm. from the bottom edge of the mailpiece
    Distance from trailing edge: >5.0 mm.
    Maximum length of dataform: 102 mm.
    Bar Height: 4 mm. +/− 0.4 mm.
    Bar Width: 0.3 mm. to 0.8 mm.
    Bar Pitch: 1.66 mm. +/− 0.25 mm.
    Length of dataform: 101.76 mm. nominal
    Skew: +/− 2 degrees

---

Figure 4C:
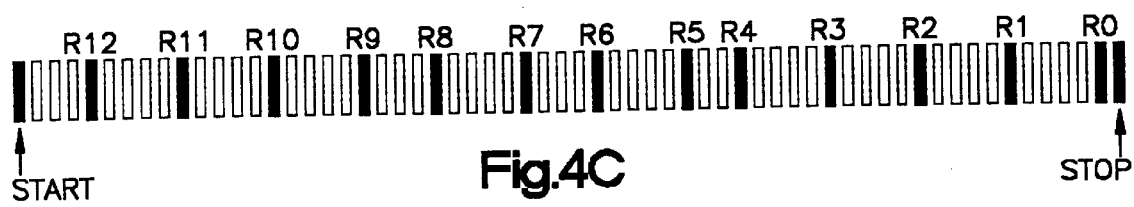
FIG. 4C is a schematic representation of the format of the US Postal Service ID tag bar code dataform.

As can be seen in FIG. 4C, the dataform format 40 comprises a 62 bar code cells corresponding to 62 encoded bits of binary information. The format 40 of the ID tag bar code dataform is as follows:

| Information | Range | Bit Fields |
| --- | --- | --- |
| Mail class | 0, 1 | 1 bit |
| Machine identification | 0001–3999 | 14 bits |
| Day of month | 01–31 | 7 bits |
| Time of day (½ hour increments) | 00–47 | 7 bits |
| Mailpiece serial number (sequence no.) | 00001–24999 | 18 bits |
| Start/stop bits (framing bits) | | 2 bits |
| Redundancy bits | | 13 bits |

Portable Data Collection Device 100

The portable, hand held data collection device of the present invention is shown generally at 100 in FIGS. 5–7. The portable data collection device 100 includes a housing 110 supporting a dataform reader. The dataform reader comprises a two dimensional charge coupled device (CCD) photosensor array imaging assembly 102. The imaging assembly 102 is capable of reading, that is, imaging and decoding a target dataform printed using ultraviolet light active ink when the target dataform is located within an imaging target area 104 (shown schematically in FIGS. 8 and 14) of the imaging assembly 102 and the imaging assembly is actuated for a dataform reading session.

Figure 29A:
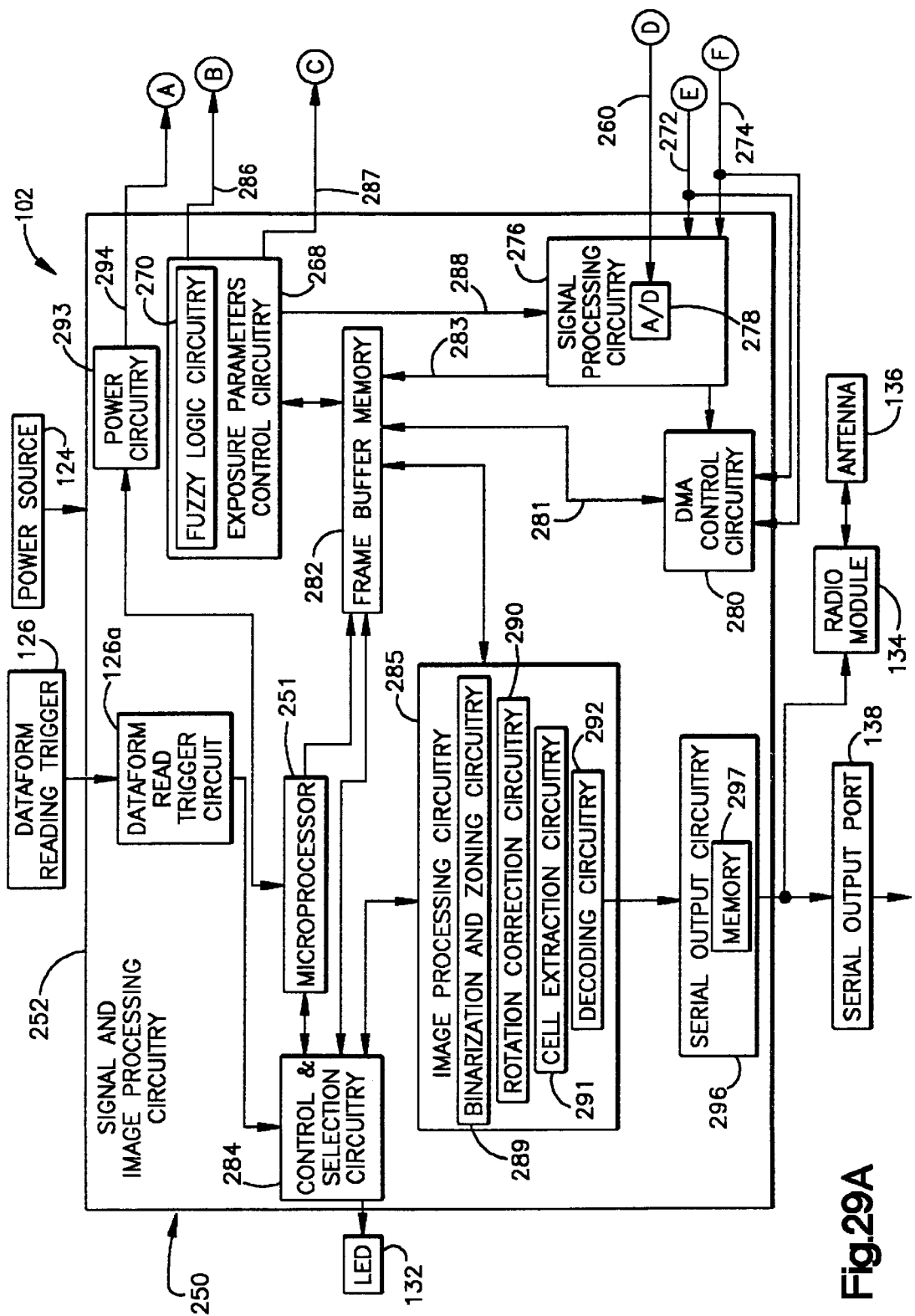
FIG. 29A is one portion of a block diagram of selected circuitry of the portable data collection device of the present invention.

The imaging assembly 102 includes a modular board camera assembly 200 and signal and image processing circuitry 250 (schematically shown in FIGS. 29A and 29B) and mounted on a control and decoder board 252 (shown in dashed line in FIG. 7 and schematically in FIG. 29A). The control and decoder board 252 is electrically coupled to electronic circuitry 201 (schematically shown in FIG. 29B) of the modular board camera assembly 200.

The board camera assembly 200 includes an optic assembly 300 (FIGS. 14 and 15) and a targeting and illumination assembly 400 (FIG. 18). The optic assembly 300 focuses light from the target area 104 onto a two dimensional photosensor array 202 of the modular board camera assembly 200. The targeting and illumination assembly 400 includes an illumination assembly 410 providing illumination of the target area 104 and a targeting illumination assembly 450 providing targeting illumination for to aid in aiming the device 100 at the target datafonm 10 such that the dataform is in the target area 104 of the imaging assembly 102.

As indicated above, the dataform 10 is imprinted on the label 12 affixed to a product or product packaging 14. Similarly, the dataform 30 is imprinted on a envelope 32. Both dataforms 10, 30 are printed using an ultraviolet light active ink. For ease of reference, the dataform 10 will hereinafter be referred to as the "target dataform" rather than reciting both dataforms 10, 30. It should be understood, however, that either of the dataforms 10, 30 are readable by the imaging assembly 102. The imaging assembly 102 is provided with appropriate signal and image processing circuitry 250 in the form of hardwired circuitry, software, firmware, application-specific integrated circuitry (ASIC), programmable controller, or any combination thereof known to those skilled in the art, to decode a captured image frame including either of the two dataforms 10, 30. Additionally, the device 100 may be advantageously provided with appropriate signal and image processing circuitry 250 to decode any of the other dataform formats recited above as desired.

Figure 9:
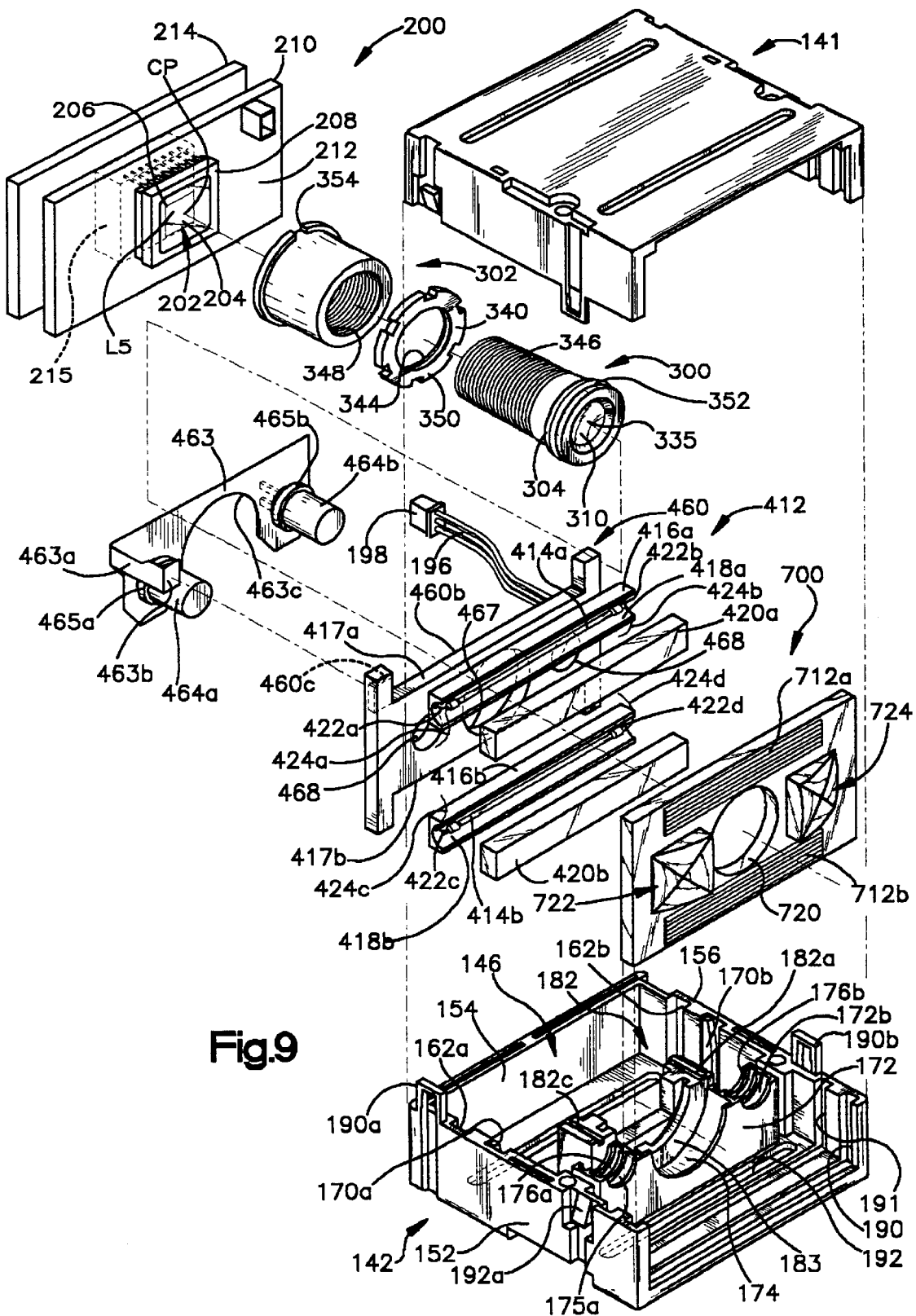
FIG. 9 is an exploded perspective view of the modular camera assembly of FIG. 8.

The portable data collection device 100 is appropriately aimed at the target dataform 10 such that the dataform 10 is within the imaging assembly target area 104. The imaging assembly 102 of the present invention is actuated to image and decode the target dataform 10. The illumination assembly 410 of the present invention is novel in that it includes a strobing ultraviolet light source 412 (FIGS. 9 and 18). The strobing ultraviolet light source 412 strobes at a rate of up to 5 cycles per second, preferably, the strobe rate is set at 5 cycles/second. However, the actual time the light source 412 is energized or "on" during a strobe cycle is a small portion of the cycle time. Preferably, the actual time the light source 412 is energized per cycle is approximately 500 microseconds ($\mu$sec).

Figure 3:
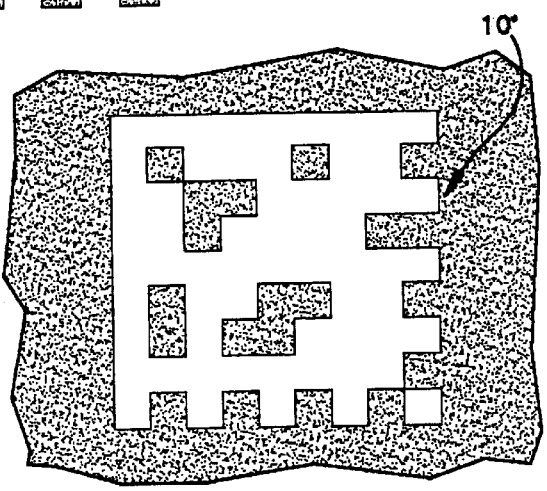
FIG. 3 is a schematic representation of an image of the matrix dataform of FIG. 1 as focused onto a two dimensional photosensor array of a dataform reader imaging assembly of a portable data collection device of the present invention.

As will be explained below, the dataform 10 is imaged when the ultraviolet light source 412 is energized to direct illumination at the imaging target area 104. The inked or printed portions of the target dataform 10 fluoresce when illuminated by the ultraviolet light source 412 and an illumination pattern 10' (shown schematically in FIG. 3) corresponding to the target dataform 10 is projected onto the two dimensional photosensor array 202 of the imaging assembly 102. A representation of the illumination pattern 10' is shown in FIG. 3. Note that the illumination pattern 10' is the "negative" of the target dataform 10, that is, the inked areas or cells of the target dataform are imaged as light or white colored areas, while the non-inked areas or cells of the target dataform are imaged as dark areas.

Configuration of the Portable Data Collection Device 100

The modular board camera assembly 200 and the control and decoder board 252 are supported in the housing 110 of the portable data collection device 100. The housing 110 which is fabricated of a durable, lightweight polymer material such as high impact polyvinyl chloride (PVC). The housing 110 defines an interior region 112 (FIG. 7). The housing 110 includes a gripping portion 114 sized to be grasped in the hand of an operator and an angled snout 116 extending from the gripping portion 114. With specific reference to FIG. 7, the snout 116 includes an opening through which a portion of the board camera assembly 200 extends. The control and decoder board 252 is supported within the gripping portion 114 of the housing 110. Also supported within the housing gripping portion 114 is a power source 124 (shown schematically in FIG. 14) such as a rechargeable battery for supplying operating power to the circuitry of the portable data collection device 100 including the signal and image processing circuitry 250 and the board camera circuitry 201. The gripping portion also supports a radio module 134 (FIG. 14) which is coupled to an antenna 136 extending through an opening in an upper surface of the housing snout 116.

A dataform reading trigger switch or actuator 126 (FIG. 7) extends through an opening in the gripping portion 114. The dataform reading trigger 126 is positioned to be depressed by an index finger of the operator while the gripping portion 114 of the housing 110 is held in the operator's hand. Depressing the trigger 126 actuates the imaging assembly 102 to institute a dataform reading session.

The gripping portion 114 also includes a small opening through which a distal portion of an indicator light emitting diode (LED) 132 is visible. The indicator LED 132 alternates between three colors. The color green is displayed by the indicator LED 132 when the device 100 is on standby, ready for use. The color orange is displayed with the device 100 has successfully completed a dataform reading session, that is, imaging and decoding the target dataform 10. The color red is displayed when the device 100 is not ready to perform an operation. A serial data output port 138 (FIG. 5) also extends through an opening in the gripping portion 114. The port 138 permits downloading of data stored in a memory 140 (shown schematically in FIG. 29A) of the device 100.

Configuration and Operation of the Imaging Assembly 102

Figure 8:
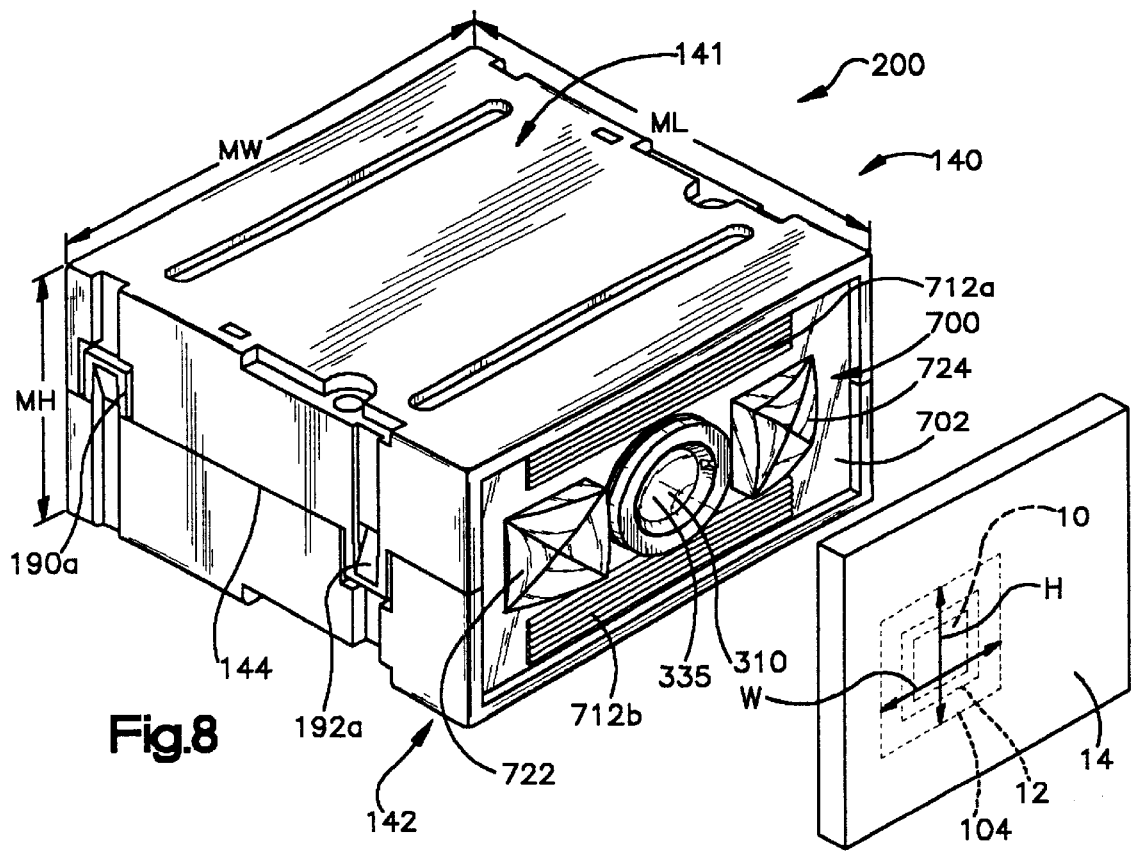
FIG. 8 is a perspective view of a modular camera assembly of an imaging assembly of the portable data collection device of the present invention, the modular portion shown imaging a target dataform affixed to a target item.
Figure 10:
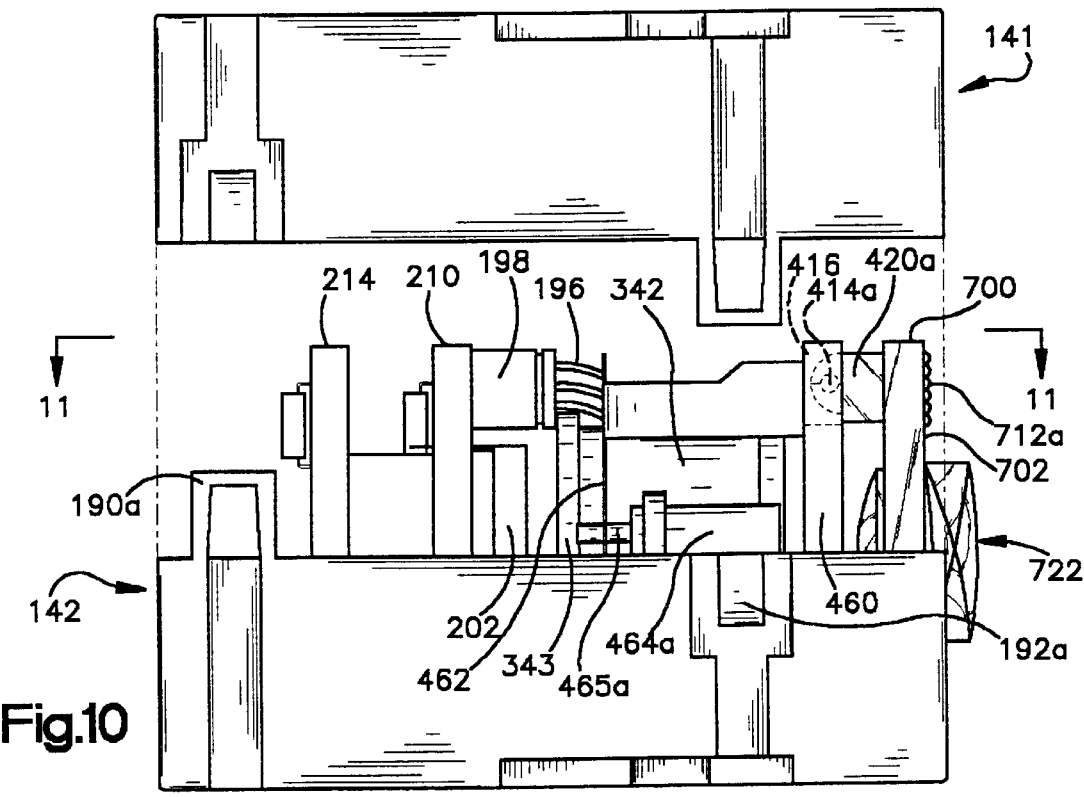
FIG. 10 is a side elevation view of the modular camera assembly of FIG. 8 with an upper half of the housing removed.

FIGS. 8 and 9 show perspective and exploded perspective views of the modular board camera assembly 200 of the imaging assembly 102. It can be seen that the modular board camera assembly 200 includes a housing 140 which supports the optic assembly 300, the targeting and illumination assembly 400 and the board camera assembly circuitry 201. The board camera assembly circuitry 201 includes the two dimensional photosensor array 202 mounted on a forward facing surface 212 of a first, frontward printed circuit board 210. The printed circuit board 210 and a second, rearward printed circuit board 214 support the board camera assembly circuitry 201. The board camera assembly 200, when actuated or energized, generates a composite video signal 260 (shown schematically in FIGS. 29A and 29B) representative of successive image frames of the imaging target area 104.

Figure 14:
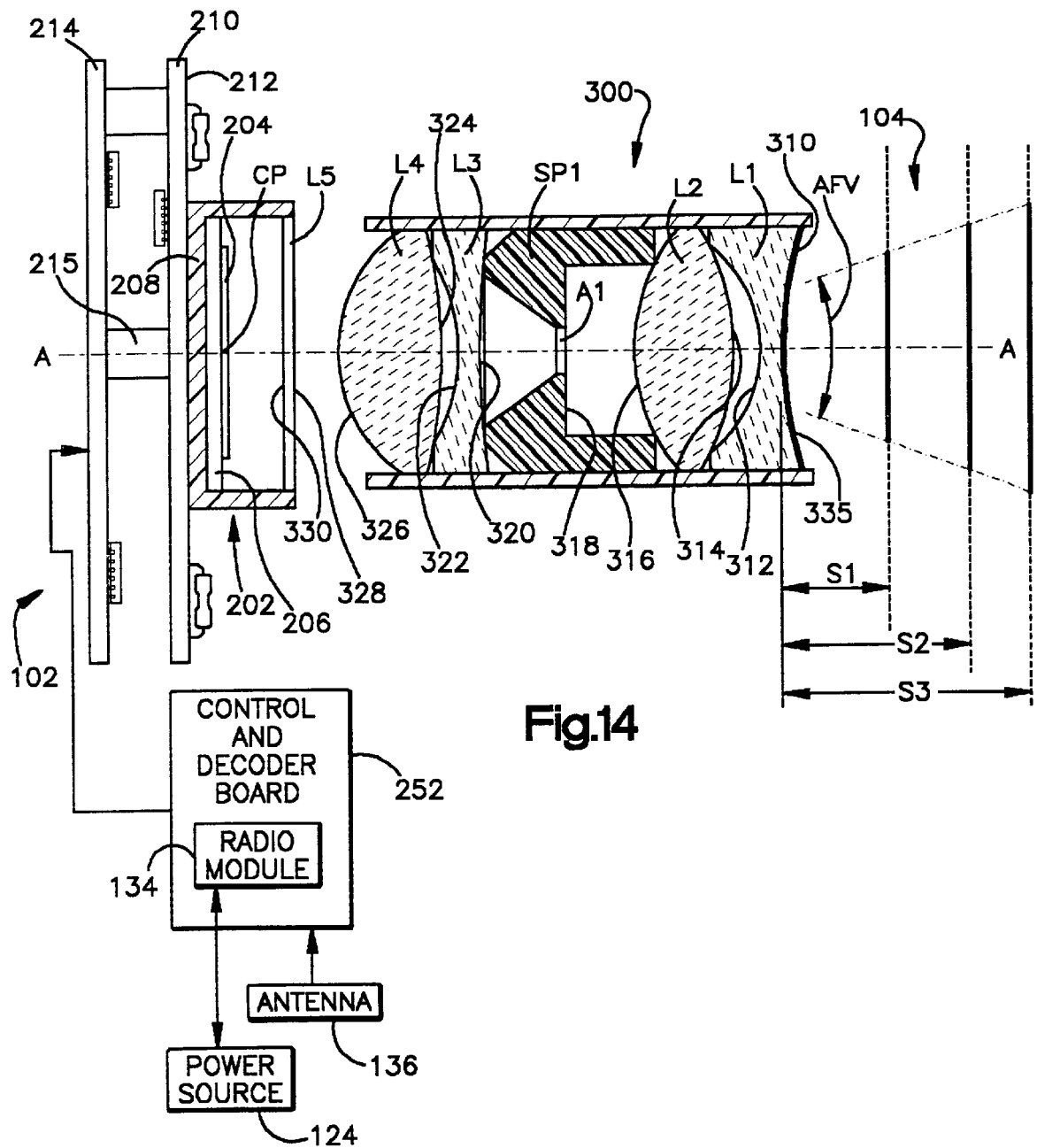
FIG. 14 is a schematic representation of a plurality of lens of an optic assembly of the modular camera assembly.

The modular board camera assembly 200 includes the optic assembly 300 which focuses an image of the imaging target area 104 onto the 2D photosensor array 202 (shown schematically in FIG. 14). Specifically, light from the imaging target area 104 is focused by the optic assembly 300 onto a forwardly facing, light receiving surface 204 of the photosensor array 202. The photosensor array 202 is part of a surface mounted integrated circuit (IC) chip 206. The photosensor array IC chip 206 is supported in an IC chip support 208 which is disposed on the front surface 212 (FIG. 9) of the front printed circuit board 210.

Structure of Photosensor Array 202

The photosensor array light receiving surface 204 comprises an array of 584 rows by 752 columns of light sensitive photosensors for a total of 439,168 photosensors in the photosensor array 202. An image of the imaging target area 104 is focused on the light receiving surface 204. The image is, as explained above, the "negative" of the image of the imaging target area 104. Light incident on a photosensor of the CCD photosensor array 202 during an exposure period charges the photosensor. Subsequent to the exposure period, the photosensor charge is read out or discharged. The charge magnitude or voltage read out from a photosensor represents an integration of the intensity of the light from the target area 104 focused on the photosensor over the exposure period.

Preferably, the exposure period of the photosensor array 202 is approximately 500 μsec. which matches the actual time the light source 412 is energized per strobing cycle. This exposure period represents a significant reduction in exposure time compared to conventional two dimensional dataform imaging systems. The high intensity illumination projected by the light source 412 onto the target area 104 permits the reduced exposure period. The shortened exposure period improves the clarity and contrast of the image of the target dataform 10 projected onto the photosensor array 202 and results in an improved signal to noise ratio (SNR) as compared to non-strobed imaging systems.

Figure 30:
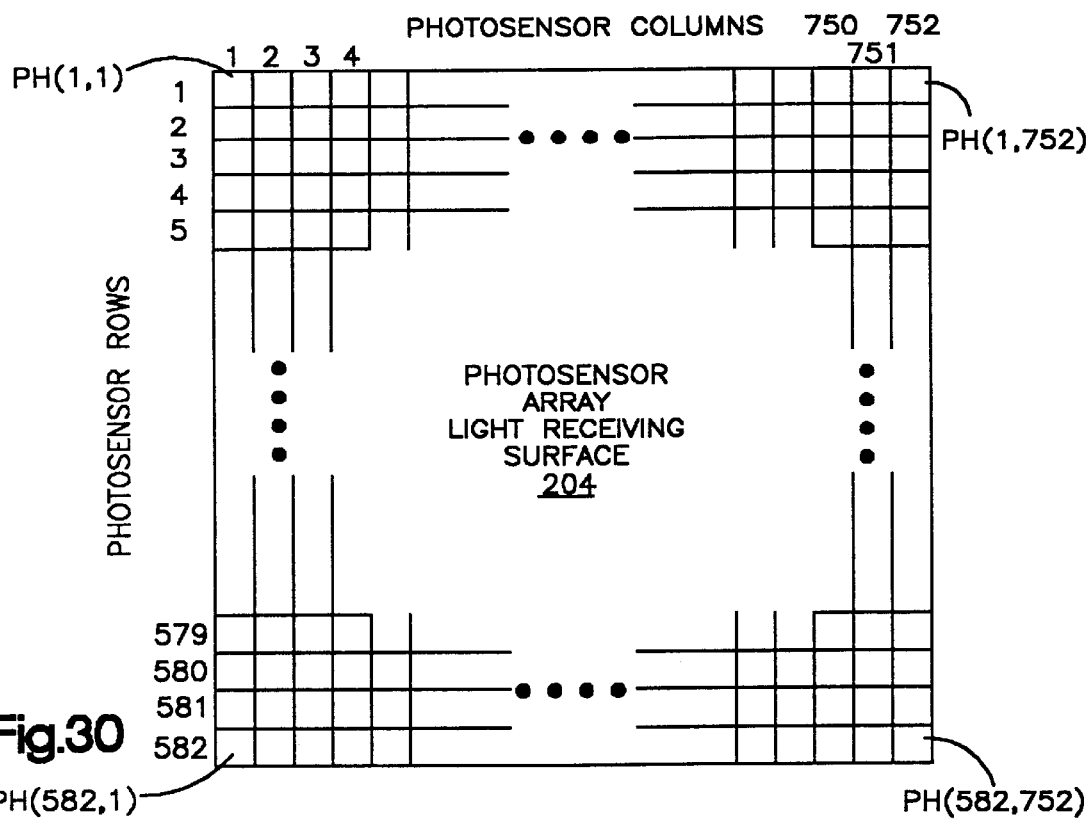
FIG. 30 is a representation of photosensors of the imaging assembly two dimensional photosensor array.
Figure 31:
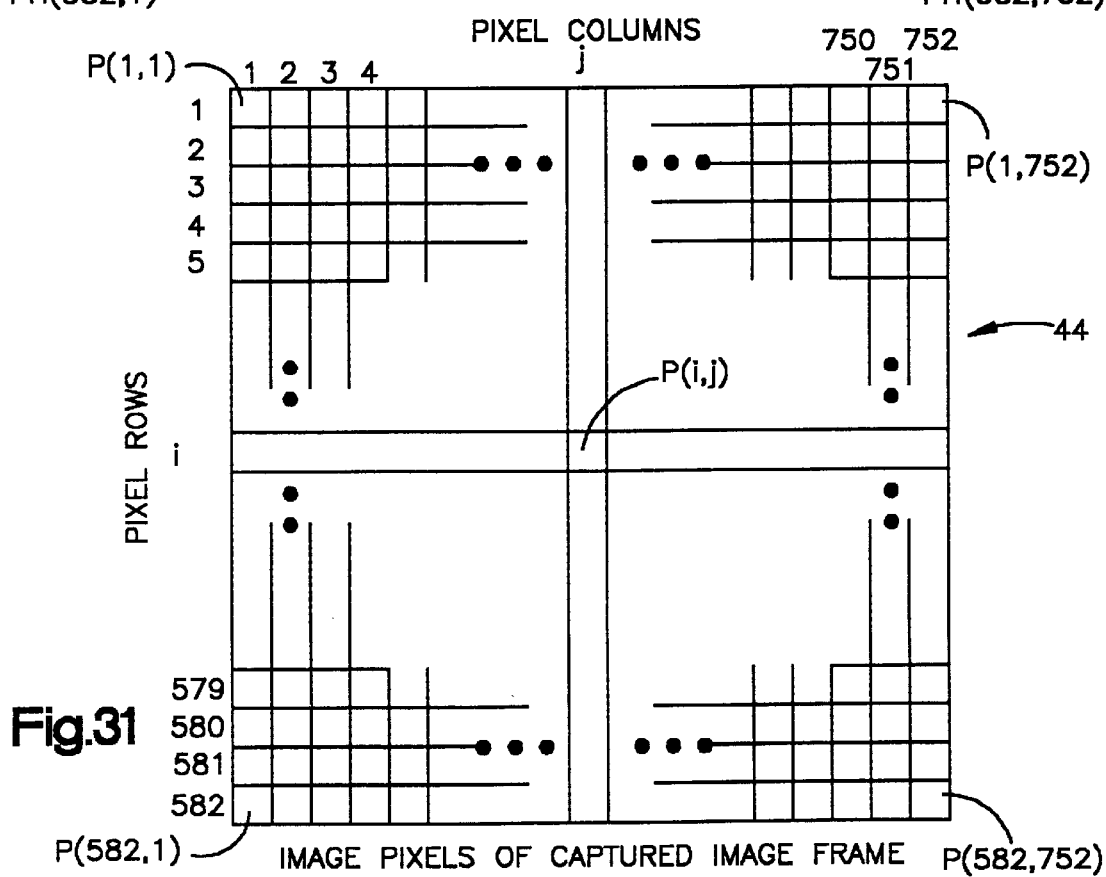
FIG. 31 is a representation of image pixels corresponding to photosensors of the imaging assembly photosensor array.

Each photosensor of the photosensor array 202 corresponds to a picture element or pixel of an image field or frame. For example, a representation of the light receiving surface 204 of the photosensor array is shown in FIG. 30. A photosensor labeled PH(1,1) is located at the intersection of photosensor row 1 and photosensor column 1 of the photosensor array 202. The range of photosensor rows ranges from 1 to 582 and the range of photosensor columns ranges from 1 to 752 for a total of 439,168 photosensors. The corresponding set of image pixels for a captured image frame is represented in FIG. 31. As can be seen from comparing FIGS. 30 and 31, the image pixel labeled P(1,1) in FIG. 31 corresponds to the photosensor labeled PH(1,1) in FIG. 30. The image pixel labeled P(582, 752) in FIG. 31 corresponds to the photosensor labeled PH(582,752) in FIG. 30. The photosensors of the photosensor array 202 are read out in a frame mode interlaced format which means at a time t1, photosensors in every other row of the photosensor array are read out (e.g., rows 1, 3, 5, . . . , 581) to generate a first captured image field comprising 219,584 image pixels. At a later time t2, photosensors in the other rows are read out (e.g., rows 2, 4, 6, . . . , 582) to generate a second captured image field comprising 219,584 image pixels.

The images represented in the first and second captured image fields, when appropriately interlaced in a row by row fashion comprise a full captured image frame comprising 439,168 image pixels.

Imaging Target Area 104 and the Optic Assembly 300

The imaging target area 104 is defined by a field of view and a depth of view of the modular camera assembly 200 and the field of view for a given target distance from the modular camera assembly is represented in FIG. 8 by the dimensions labeled "H" (for height of imaging target area 44) and "W" (for width of the imaging target area 104). The lenses of optic assembly 300 define both the field of view and the depth of view of the target area 104.

The optic assembly 300 of the present invention is specifically configured to permit the imaging assembly 102 to read standard density dataforms having a minimum cell size of 6.6 mils (0.0066 in. or 0.167 mm.). The minimum cell size of a dataform is defined as the smallest dimension of a separately readable information conveying portion of the dataform.

FIG. 14 shows a cross section of the camera assembly 38 with the optic assembly 300 focusing an image of the imaging target area 104 onto the photosensor array 202. The optic assembly 300 includes a shroud assembly 302 (FIGS. 9 and 15) and a lens assembly LA (FIG. 14). The lens assembly LA includes lenses L1, L2, L3, L4 and a spacer member SP1 with a small central aperture A1 (1.17 mm. in diameter) all supported within an inner cylindrical shroud 304 (best seen in FIG. 9). The lens assembly LA also includes a lens L5 which is supported by an upper surface of the photosensor array IC chip support 208. Thus, there are eleven optic surfaces (including the portion of the spacer member SP1 defining the aperture A1) labeled 310, 312, 314, 316, 318, 320, 322, 324, 326, 328, 330 in FIG. 14.

The outwardly facing optic surface 310 of the outermost lens L1 of the optic assembly 300 includes a color filter coating 335 which blocks ultraviolet illumination from passing through the optic assembly and permits only light in the visible spectrum to be focused on the photosensor array 202. The color filter coating 335 provides peak transmission of illumination at a wavelength of 590 nm. and has a relatively narrow bandwidth (substantially 580–605 nm.) in the visible range of the electromagnetic spectrum. The bandwidth of the color filter coating 335 corresponds to the orange portion of the visible range and enhances imaging contrast and reduces the reflection from a white or light colored background projected on the photosensor array 202.

The shroud assembly 302 also includes a lock nut 340 and an outer shroud 342. The lock nut 340 includes internal threads 344 (FIG. 9) which thread onto external threads 346 of the inner shroud 304. When the lock nut 340 is properly positioned on inner shroud threads 346, the inner shroud 304 is threaded into internal threads 348 of the outer shroud 342. When assembled, the forward facing surface 350 of the lock nut 340 abuts a back surface 460b of a printed circuit board 460. As will be explained below, the outer shroud 342 is securely held in place by a second support 182 (FIG. 12) of the upper and lower housing portions 141, 142 of the board camera modular housing 140 thereby insuring a proper perpendicular angle relationship between an optical axis through the optic centers of each of the lenses L1, L2, L3, L4 and the outward facing, light receiving surface 204 of the photosensor array 202. The outer shroud 342 includes an outwardly flared end portion 343 (FIGS. 15 and 17) having two cut portions 354 which facilitates position the optic assembly 300 being precisely positioned with respect to the photosensor array 202.

Figure 11:
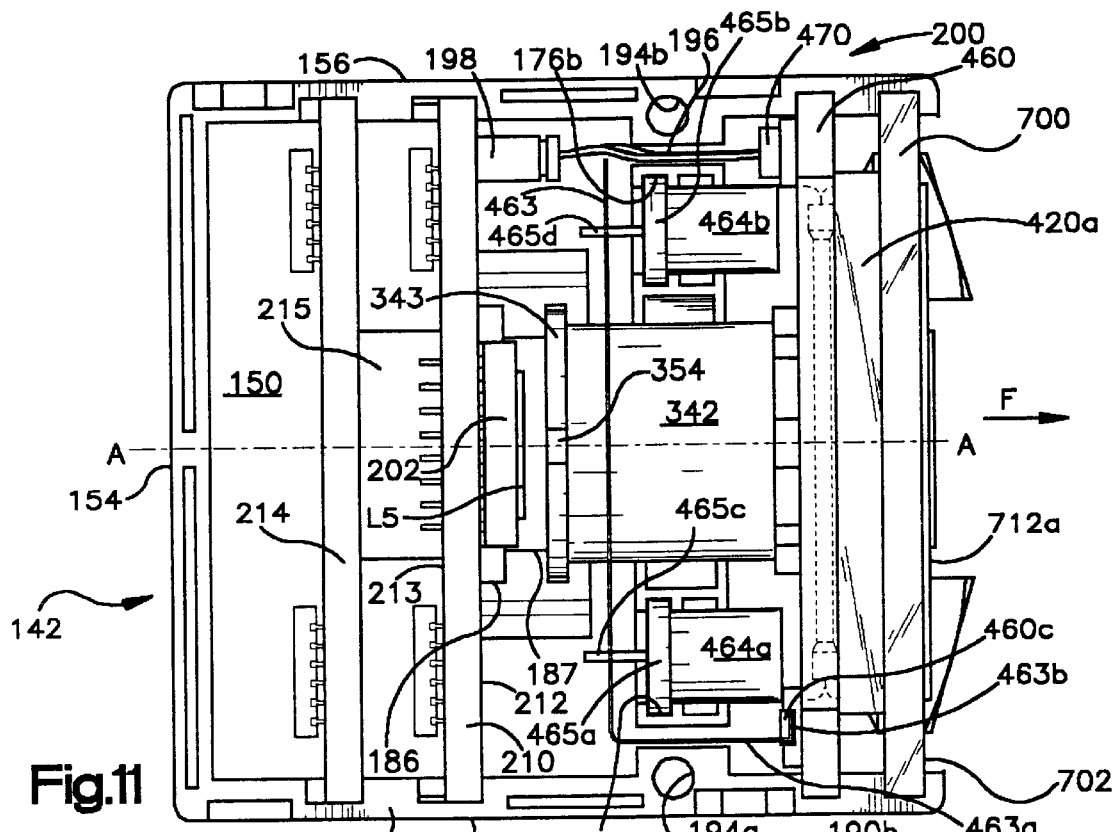
FIG. 11 is a top plan view of a the modular camera assembly of FIG. 8 with an upper half of the housing removed as seen from a plane indicated by the line 11—11 in FIG. 10.

Additionally, the lock nut 340 facilitates precise positioning of the lenses L1, L2, L3, L4 of the lens assembly LA with respect to the longitudinal displacement of the lenses along an optical axis labeled A—A in FIG. 11. The precise positioning of the lenses L1, L2, L3, L4, L5 with respect to the photosensor array 202 permits the sharpest possible image of the target dataform 10 to be directed on the center point CP of the light receiving surface 204 of the photosensor array 202. As can best be seen in FIG. 15, an O-ring 352 is disposed in a annular groove in the outer surface of the inner shroud 304. The O-ring 352 seals against a central opening 720 of a lens array 700 to prevent external contaminants from entering the interior region 146 of the modular housing 140.

Turning to FIG. 14, based on the distance between the optic assembly 300 and the photosensor array 202, for a given dataform minimum cell size or dimension, there exists a best focus position S2 in front of the forward-most surface 310 of the lens L1 of the optic assembly 300 at which an image of the target dataform 10 in the imaging target area 104 will be focused sharpest on a center point CP of the light receiving surface 204 of the photosensor array 202. The image sharpness gradually degrades as the target dataform 10 is moved from the best focus position inwardly towards a near field cut off distance S1 or away toward a far field cut off distance S3. At the near field and far field cut off distances S1, S3, a target dataform having the specified minimum cell size is still capable of being decoded. However, at distances less than S1 or greater than S3, the imaging assembly 102 will no longer be able to decode the target dataform.

As noted above, the imaging target area 104 is defined by an angular field of view and a depth of the field of view. The horizontal and vertical angular field of view of optic assembly 300 is 32° (horizontal)×24° (vertical). This corresponds to a 40° diagonal field of view. The horizontal angular field of view is shown schematically as an angle labeled with the designation AFV in FIG. 14. The depth of the field of view is defined by the near field and far field cut off distances S1 and S3. The cut off distances are set forth below for a number of different dataform minimum cell sizes. At the S1 and S3 distances, a dataform having the specified minimum cell size can still be decoded by the imaging assembly 102. For a dataform having a minimum cell size of 15 mil, the S2 best focus working distance is 140 mm. (5.5 in.).

The preferred optic assembly 300 includes four lenses L1, L2, L3, L4 and the plastic spacer member SP1 separating lenses L2 and L3. The lenses L1, L2, L3, L4 and the spacer member SP1 are supported in the inner shroud 304 of the shroud assembly 302. A flat lens L5 is mounted on an upper surface of the photosensor array IC chip support 208 and overlies the light receiving surface 204 of the photosensor array 202. Features of the optic assembly 300 include:

| | |
|---|---|
| Field of view | 32° (Horizontal) × 24° (Vertical) |
| | 82 mm. (3.2 in.) × 62 mm. (2.4 in.) at a working distance of 140 mm. (5.5 in.) |
| Minimum decode cell size | 6.6 mil |
| Ambient light | total darkness to full sun light |
| Spectral range | 400–700 nm. |
| Focal length | 8 mm. |
| F-number | 9 |
| Image size | 4.8 mm. (Horiz.) × 3.6 mm. (Vertical) |
| Resolution | MTF > 50% @ 50 cyc/mm |
| Distortion | 1% |

Image size refers to the size of the image projected onto the photosensor array light receiving surface 204. The working range of the optic assembly 300 with respect to reading 15 mil dataforms is as follows:

| Cell size Rotation | Min. working distance S1 | Max working distance S3 | Pitch | Skew |
|---|---|---|---|---|
| 15 mil. | 65 mm. (2.5 in.) | 290 mm. (11.5 in.) | 15° | 15° 360° |

The field of view or imaging target area 104 of the optic assembly 300 at the best focus distance S2 of 140 mm. (5.5 in.) and at the minimum and maximum working distances S1, S3 are as follows:

| Distance | Width | Height |
|---|---|---|
| S1 | 37 mm. (1.5 in.) | 28 mm. (1.1 in.) |
| S2 | 82 mm. (3.2 in.) | 62 mm. (2.4 in.) |
| S3 | 166 mm. (6.5 in.) | 123 mm. (4.9 in.) |

The optic prescriptions for each of the optic surfaces of the optic assembly 300 are as follows:

| Optic Surface | Radius of Surface Curvature | Diameter | Shape |
|---|---|---|---|
| 310 | 10.093 mm. | 7 mm. | Concave |
| 312 | 3.635 mm. | 7 mm. | Concave |
| 314 | 6.995 mm. | 7 mm. | Convex |
| 316 | 5.834 mm. | 7 mm. | Convex |
| 318 (Flat) | Infinity - Pinhole diameter 1.171 mm. | 7 mm. | Flat |
| 320 | 25.116 mm. | 7 mm. | Concave |
| 322 | 5.834 mm. | 7 mm. | Concave |
| 324 | 13.499 mm. | 7 mm. | Convex |
| 326 | 4.325 mm. | 7 mm. | Convex |
| 328 (Flat) | Infinity | 7 mm. | Flat |
| 320 (Flat) | Infinity | 7 mm. | Flat |

The distance between successive optical surfaces 310–320 is as follows:

| Optic Surface | Distance |
|---|---|
| 310–312 | 0.529 mm. |
| 312–314 | 0.609 mm. |
| 314–316 | 2.389 mm. |
| 316–318 | 1.714 mm. |
| 318–320 | 2.114 mm. |
| 320–322 | 0.599 mm. |
| 322–324 | 0.366 mm. |
| 324–326 | 2.482 mm. |
| 326–328 | 7.27 mm. |
| 328–330 | 0.60 mm. |
| 330-Photosensor | 1.31 mm. |

Where "Photosensor" refers to the light receiving surface 204 of the photosensor array 202. The glass type for each lens L1, L2, L3, L4, L5 of the lens assembly LA is as follows:

| Lens | GLASS TYPE | REFRACTIVE INDEX |
|---|---|---|
| L1 | SF5 Schott | 1.67270 |
| L2 | RAFD13 Roya | 1.85540 |
| L3 | SF11 Schott | 1.78472 |
| L4 | LAK21 Schott | 1.64050 |
| L5 | BK7 Schott | 1.51289 |

The lenses L1, L3, L4, L5 are available from Schott Glass Technologies, Inc. of Duryea, Pa. The lens L2 is available from Hoya Corp USA, Optics Division, located in San Jose, Calif.

Illumination Assembly 410

The targeting and illumination assembly 400 includes the illumination assembly 410 and the targeting illumination assembly 450. The illumination assembly 410 includes the ultraviolet light source 412 comprising a pair of miniature strobing flash tubes 414a, 414b (FIG. 9) affixed to a pair of support members 416a, 416b. The support members 416a, 416b each having a curved, reflective surface 418a, 418b which direct the strobing illumination of respective flash tubes 414a, 414b when energized, through a respective one of a pair of ultraviolet filters 420a, 420b and the lens array 700 toward the imaging target area 104.

The flash tubes 414a, 414b are gas discharge tubes that produce high intensity, short duration flashes of illumination ranging in wavelength from the ultraviolet to the infrared portions of the electromagnetic spectrum. The flash tubes 414a, 414b have a strong, high intensity output in the ultraviolet range of the electromagnetic spectrum. The ultraviolet filters 420a, 420b overlie respective reflective surfaces 418a, 418b and function to permit only illumination in the ultraviolet range of the electromagnetic spectrum to be directed toward the target area 104.

Wavelengths of illumination produced by the flash tubes 414a, 414b which are not in the ultraviolet range, e.g., visible range illumination, are filtered out by the ultraviolet filters 420a, 420b. A suitable ultraviolet filter is product no. UG-1 sold by Reynard Corporation of San Clemente, Calif. The Reynard UG-1 filter is a black glass filter having a transmission range of 300 to 400 nm. The ultraviolet filters 420a, 420b function to minimize background reflection from the target area 104 caused by visible light which may irritate the operator's eyes.

The flash tubes 414a, 414b are configured to strobe at a flash rate of up to 5 flashes or cycles per second. The preferable strobing rate is 5 flashes/second resulting in a strobing cycle of 0.2 seconds. As explained above, the actual time the flash tubes 414 are energized during a strobe cycle is a small portion of the cycle time. Preferably, the flash tubes 414a, 414b are energized for approximately 500 microseconds ($\mu$sec.) per cycle. For a strobing cycle of 0.2 seconds, the flash tubes 414a, 414b are is energized only about 0.25% of the time (0.25% duty cycle). The flash tubes 414a, 414b produce a very high intensity illumination. The exposure time of the photosensor array 202 is set at 500 $\mu$sec. to match the energization time of the flash tubes 414a, 414b.

The strobing effect, high intensity of the illumination assembly and the use of a short photosensor array exposure time advantageously combine to reduce the magnitude of ambient light focused onto the photosensor array 200 thereby improving the clarity and contrast of the image of the target dataform 10 projected onto the photosensor array 202. Further, the short exposure time also reduces the deleterious smearing effects caused by hand movement or jittering by the operator during a dataform reading session. The better the quality of the target dataform image projected onto the photosensor array 202, the greater the probability of a successful decode of the dataform image.

A suitable flash tube strobe light is product no. CGA1010 manufactured by EG&G Heimann Optoelectronics GmbH, Weher Koppel 6, 65199 Wiesbaden, Germany. The CGA 1010 flash tube is cylindrical in shape having a diameter of 3.2 mm. and a length of 23.5 mm. As can best be seen in FIG. 18, the flash tube 414a is supported by support wires 422a, 422b extending outwardly from the reflective surface 418a of the support member 416a. The flash tube 414b is supported by support wires 422c, 422d extending outwardly from the reflective surface 418b of the support member 416b. The support wires 422a, 422b, 422c, 422d are affixed near the ends of the flash tubes 414a, 414b.

Power is routed to the flash tube 414a through pairs conductive leads 424a, 424b coupled between ends of the flash tube 414*a* and appropriate circuitry (not shown) disposed the front side 460*a* of the circuit board 460. Similarly, power is routed to the flash tube 414*b* through pairs conductive leads 424*c*, 424*d* coupled between ends of the flash tube 414*b* and appropriate circuitry disposed the circuit board front side 460*a*. One support member 416*a* is horizontally mounted in an indented portion or slot 417*a* in an upper edge of the printed circuit board 460 while the other support member 416*b* is horizontally mounted in a slot 417*b* in a lower edge of the printed circuit board 460.

When a dataform reading session is instituted by the operator depressing the dataform reading trigger 126, the illumination assembly 410 and the targeting illumination assembly 450 are alternately energized. Thus, an image frame captured during deenergization of the targeting illumination assembly does not have any illumination "hot spots" or reflected glare and the imaged dataform which is the dataform 10 is suitable to be processed and decoded. The cells of the dataform 10 imprinted with ultraviolet active ink fluoresce when exposed to the ultraviolet illumination and generate illumination in the visible spectrum. The non-ink, cells of the dataform 10 reflect most of the illumination from the ultraviolet light source 412.

As discussed above, the outer optic surface 310 of the outermost lens L1 of the optic assembly 300 includes the color filter coating 335 that functions as an ultraviolet light filter, that is, the coating has a narrow bandwidth at excitation and permits only light in the visible spectrum to be focused on the photosensor array 202. Thus, the visible light emitted by the fluorescence of the ultraviolet active ink cells is focused on the photosensor array 202. Consequently, the image focused on the photosensor array 202 when the dataform 10 is in the target area 104 of the imaging assembly 102 corresponds to a negative of the dataform 10, that is, the image of the target area 104 focused on the photosensor array 202 includes light areas corresponding to cells of the dataform 10 that are imprinted with the ultraviolet active ink and further includes dark areas corresponding to cells of the dataform 10 having no ink.

Image processing circuitry 285 (shown schematically in FIG. 29A and discussed below) of the imaging assembly 102 takes this contrast reversal into account when decoding the image of the dataform 10. The actuation and deactuation (turning on and off) of components of the imaging assembly 102 is performed by control and selection circuitry 284 (FIG. 29A) which is part of signal and image processing circuitry 250. All of this circuitry operates under the control of a microprocessor 251.

Figure 32:
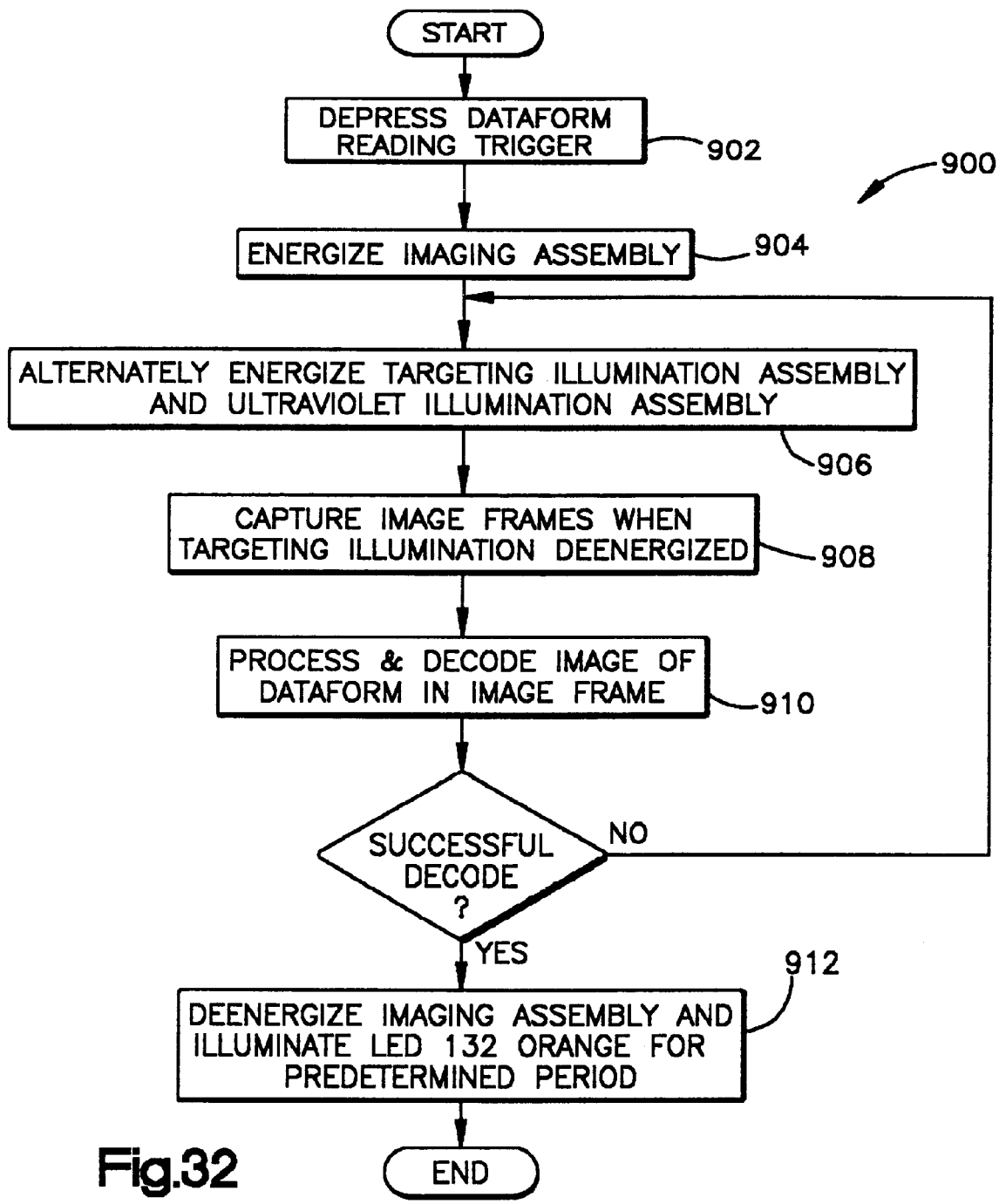
FIG. 32 is a flow chart for reading (imaging and decoding) of an ultraviolet light active ink dataform using a strobing ultraviolet light source illumination assembly.

In FIG. 32, a flow chart is shown at 900 which sets forth the processing steps associated with a dataform reading session. Upon the operator depressing the dataform reading trigger 126, at step 902, the imaging assembly 102 is actuated at step 904. At step 906, the targeting illumination assembly 450 is alternately energized with the illumination assembly 410. Assuming the device 100 is properly aimed at the dataform 10, at step 908, target area image frames including the dataform 10 are captured. As noted above, only image frames captured during periods when the targeting illumination was off are suitable for processing and decoding. At step 910, a suitable image frame is processed and an attempt is made to decode the image of the dataform 10 represented within the captured image frame.

Upon successful decoding of the dataform 30, at step 912, the imaging assembly 102 including the targeting illumination 450 and the illumination assembly 410 are turned off and the LED 132 is energized to display an orange color to notify the operator that the reading of the dataform 10 has been successfully completed. If the decoding is not successful, the process returns to step 906 and the steps described are repeated.

As is clear from the above explanation, the illumination assembly 410 and the targeting illumination assembly 450 are actuated or energized by the control and selection circuitry 284 on a mutually exclusive basis. While the exposure period of the photosensor array 202 is preferably set at 500µsec. to match the energization time of the flash tubes 414*a*, 414*b*, the total processing time to image and then process and decode the imaged target dataform is approximately 0.2 seconds or 200 msec. This total processing time corresponds to the strobing cycle of the flash tubes 414*a*, 414*b*. So, if a first captured image frame is decodable, one strobing cycle is all that is necessary to decode the captured image of the target dataform 10.

If the first captured image frame is not decodable, a second strobing cycle would be permitted to occur to generate a second captured image frame. The processing and decoding process would be attempted on the second image frame. If decoding were successful, the imaging assembly 102 would be turned off. If decoding were not successful, a third image frame would be captured and the processing and decoding process attempted as explained above. The entire process would continue until successful decoding of the image of the target dataform 10 had been achieved.

The illumination assembly 410 also includes the lens array 700. The lens array 700 functions as the outer or front panel of the modular camera assembly 200. The term "front panel" will be used interchangeably with the term "lens array" throughout. The lens array 700 is a single piece acrylic or polycarbonate, preferably fabricated of PMMA (polymethyl methacrylate), and is positioned between the printed circuit board assembly 460 and the target area 104 (FIGS. 8 and 9) for directing the illumination from the flash tubes 414*a*, 414*b* toward the target area 104. With respect to the flash tube 414*a*, the ultraviolet illumination passes through a flat entry optic 714*a* and exits through a diffuser exit optic 712*a*. With respect to the flash tube 414*b*, the ultraviolet illumination passes through a flat entry optic 714*b* and exits through a diffuser exit optic 712*b*. The diffuser exit optics 712*a*, 712*b* are comprised of six horizontally oriented half cylinders (semicircles when viewed cross section). The half cylinders each have a radius of curvature of 0.5 mm. The height of the exit and entry optics 712*a*, 712*b*, 714*a*, 714*b*, as shown by the dimension labeled I in FIG. 22, is 2.5 mm. The width of the exit and entry optics 712*a*, 712*b*, 714*a*, 714*b* as shown by the dimension labeled J in FIG. 22, is 24 mm. The diffuser exit optics 712*a*, 712*b* function to insure that the ultraviolet illumination directed toward the imaging target area 104 is substantially uniform thereby eliminating any illumination hot spots in the target area 104. The diffuser exit optics 712*a*, 712*b* additionally insure that the ultraviolet illumination directed toward the target area 104 has an angular field of view horizontally and vertically which substantially corresponds to the angular field of view horizontally and vertically of the optic assembly 300.

Targeting Illumination Assembly 450

The targeting assembly 450 provides a targeting arrangement including targeting LEDs 482*a*, 482*b*, which, when energized, project illumination through first and second targeting optics 484*a*, 484*a* thereby generating a crosshair targeting illumination pattern CR to aid in aiming the device 100. To avoid image distortion, the targeting pattern CR is intermittently turned off by the imaging assembly 102 when the image frames of the imaging target area 104 are being captured. In FIG. 26, the crosshair illumination pattern CR is shown aimed at the dataform 10.

The targeting and illumination assembly 400 includes the printed circuit board 460, the lens array 700 and the flexible printed circuit board 463 (FIGS. 9 and 18). The flexible printed circuit board 463, which routes power to a pair of targeting LEDs 464a, 464b, is also electrically coupled to the circuit board 460. The flexible printed circuit board 463 has a central unshaped cut out region 463c to provide clearance for the outer shroud of the shroud assembly 302. The targeting LEDs 464a, 464b, when energized, project targeting illumination through openings 468 in the circuit board 460 and through targeting optics 722, 724 of the lens array 700 to form the crosshairs light or illumination pattern CR which aids in aiming the device 100 at the target dataform 30.

Because the desired working range and field of view of the portable data collection device 100 dictates that the optic assembly 300 have a large F number (F#9), the visible illumination assembly 410 must provide adequate illumination of the imaging target area 104 during the 500μsec. exposure period so that enough light is absorbed by the photosensor array 202 to generate a suitably bright image The printed circuit board assembly 460 includes printed conductors and conductive leads 196 (FIG. 9) including a power lead operative for supplying power to the board camera assembly circuitry 201 mounted on the board assembly 460 including suitable power to the conductive wires 424a, 424b electrically (FIGS. 9 and 18) coupled to the flash tubes 414a, 414b.

Referring to FIGS. 21–23, suitable dimensions for the lens array 700 are as follows:

| Label | Description | Dimension |
|---|---|---|
| A | Height of lens array 700 | 21.75 mm. |
| B | Width of lens array 700 | 39.55 mm. |
| C | Diameter of center opening 720 of lens array 700 | 12.00 mm. |
| D | Height between entry surfaces 714a, 714b | 14.13 mm. |
| E | Thickness of lens array 700 | 1.95 mm. |

Referring again to FIG. 18, the targeting and illumination assembly 400 also includes the targeting illumination arrangement or assembly 450 to aid in aiming the device 100 at the target dataform 10. The targeting illumination assembly 450 includes the targeting LED illuminators 464a, 464b, which extend into apertures 468 (FIG. 9) in the printed circuit board assembly 460 and, when energized, project illumination into first and second targeting optics 722, 724 respectively of the lens array 700. The first and second targeting optics 722, 724 are mirror images of each other and are identical in configuration. Each targeting optic generates a crosshair pattern of illumination CR1, CR2 (seen in FIGS. 28 and 28).

If the target dataform 10 is at a proper distance for imaging, i.e., at the best focus position S2 of the optic assembly 300, the crosshairs CR1, CR2 will coincide or overlap producing a single rectangular crossing or crosshair pattern of illumination labeled CR (FIGS. 18 and 26). The rectangular illumination pattern CR will have a height (labeled "h" in FIG. 18) of 62 mm. (2.4 in.) and a width (labeled "w" in FIG. 18) of 82 mm. (3.2 in.) at the best focus position S2 (140 mm.). The rectangular illumination pattern CR substantially corresponds to the target area 104 of the optic assembly 300 at the best focus position S2. Of course, the rectangular illumination pattern CR will not be a perfect intersecting line crosshair but rather will be characterized by an illumination intensity distribution or pattern having some visible "thickness" labeled "t" in FIG. 18, but will nonetheless be suitable for aiming the device 100.

The first and second targeting optics 722, 724, which are identical in configuration, are shown in cross section in FIGS. 24 and 25. The first targeting optics 722 comprises a lens with an aspherical light entry optic surface 726 and a segmented cylindrical light exit optic surface 728. The second targeting optics 724 comprises a lens with an aspherical light entry optic surface 730, similar to the aspherical light entry optic surface 726, and a segmented cylindrical light exit optic surface 732, similar to the segmented cylindrical light exit optic surface 728.

The aspherical entry surfaces 726, 730 each have a diameter of 8 mm., a radius of curvature of 2.890 mm. and a conic constant of −2.534. The segmented cylindrical light exit surfaces 728, 732 each have an 8.0 mm. by 8.0 mm. square shaped outer perimeter. The segmented cylindrical surface 728 is comprised of four triangular shaped sections 740, 742, 744, 746 (FIG. 21) while the segmented cylindrical surface 732 is divided into four triangular shaped sections 750, 752, 754, 756, wherein the optic surfaces of sections 740 and 750 are identical, the optic surfaces of sections 742 and 752 are identical, the optic surfaces of sections 744 and 754 are identical and the optic surfaces of sections 746 and 756 are identical.

Upper and lower triangular sections 740, 744 comprise vertically oriented cylindrical light exit optic surfaces. Left and right triangular sections 742, 746 comprise horizontally oriented cylindrical light exit optic surfaces. Similarly, upper and lower triangular sections 750, 754 comprise vertically oriented cylindrical light exit optic surfaces, while left and right triangular sections 752, 756 comprise horizontally oriented cylindrical light exit optic surfaces. The vertically oriented cylindrical optic surfaces 740, 744, 750, 754 have a radius of curvature of 25.00 mm. Similarly, the horizontally oriented cylindrical optic surfaces have a radius of curvature of 25.00 mm.

As can best be seen in FIG. 24, the horizontally and vertically oriented cylindrical optic surfaces 742, 746, 740, 744 are tipped at an angle c with respect to a longitudinal axis L—L though the lens array 700 and, therefore, is also tipped at an angle c with respect to the target area 104 (that is, parallel to the plane defined by a generally flat front surface 702 of the lens array 700). The tip angle c of the horizontally oriented cylindrical optic surfaces 742, 746 shifts the horizontal position of the illumination rectangle or targeting crosshair CR1 (schematically shown in FIG. 18) generated by the first targeting optics 722 such that it is horizontally centered in the target area 104 while the tip angle c of the vertically oriented cylindrical optic surfaces 740, 744 shifts the vertical position of the targeting crosshair CR1 generated by the first targeting optics 722 such that it is vertically centered in the imaging target area 104. A suitable tip angle of c is 9.83 degrees.

Similarly, as can also be seen in FIG. 24, the horizontally and vertically oriented cylindrical optic surfaces 752, 756, 750, 754 are also tipped at an angle c which is preferably 9.83 degrees with respect to a longitudinal axis L—L though the lens array 700. Note that the direction of tilt of the segmented cylindrical light exit surfaces 728, 732 are the same in magnitude but opposite in a direction of tilt, that is, the light exit surface 728 of the first targeting optics 722 slants downwardly to the left toward the front side 702 in FIG. 24 while the light exit surface 732 of the second targeting optics 724 slants downwardly to the right toward the front side 702. Also note that the two horizontally oriented light exit optic surfaces 718 which would be seen in FIG. 24 have been removed for clarity of the drawing. It should also be noted that FIG. 20 which shows the segmented cylindrical light exit surface 732 as being comprised of four individual exploded "pieces" is only a representation to provide additional clarity as to the shape and tilt of the four light exiting surfaces 750, 752, 754, 756. The lens array 700 is fabricated as a single piece and the targeting optics 722, 724 and illumination optics 716, 718 are formed in the single piece. The lens optics are not fabricated by "piecing" together individual optics as might be assumed in looking at FIG. 20.

Additional suitable dimensions, labeled on FIG. 24, for the aspheric light entry surfaces 726, 730, the segmented cylindrical light exit surfaces 728, 732 of the lens array 700 are as follows:

| Label | Description | Dimension |
| --- | --- | --- |
| F | Maximum extension of aspheric light exit surfaces 726, 730 from back side 704 of lens array | 1.75 mm. |
| G | Distance between maximum extension of aspheric light exit surfaces 726, 730 and center of respective segmented light exit surfaces 728, 732 along centerlines T-T | 5.25 mm. |
| H | Distance between centerlines T-T and outer edge of lens array 700 | 7.80 mm. |

Targeting Illumination Crosshairs CR1, CR2

As noted above, the best focus distance S2 is 140 mm. (5.5 in.). If the device 100 is oriented such that generally flat front surface 702 of the lens array 700 is substantially parallel to a surface of the target dataform 10 and positioned at the best focus distance S2 from the target, then the targeting crosshairs CR1 and CR2 will coincide and generate the single targeting crosshair CR as shown in FIG. 26 having an approximate height h of 62 mm. (2.4 in.) and an approximate width w of 82 mm. (3.2 in.) which substantially corresponds to the target area 44 height of 62 mm. and width of 82 mm. at the best focus position S2 of 140 mm. (5.5 in.) in front of the optic surface 310 of lens L1.

If the device 100 is moved away from the best focus distance S2 with respect to the target dataform 10, the targeting crosshairs CR1 and CR2 will separate horizontally as shown in FIG. 27 thereby informing the operator that the distance of the device 100 from the target dataform 10 is not correct for best imaging or imaging and decoding. Finally, if the lens array 700 is not substantially parallel to a surface of the target dataform 10, that is, the device 100 is tilted forward or backward from a position where the front surface 702 of the lens array or front panel 700 is parallel to the target surface, the vertical portions of the illumination patterns of CR1 and CR2 will be angularly shifted or displaced as shown in FIG. 28, the greater the angle of tilt of the device 100, the greater will be the angular shifting of the vertical portions of the illumination patterns CR1, CR2.

Modular Camera Assembly Housing 140

The modular board camera assembly 200 is shown in FIGS. 8–13B. Suitable exterior dimensions for the two piece housing 140 of the board camera assembly 200 are as follows:

| Housing | Label | Dimension |
| --- | --- | --- |
| Height | MH (FIG. 8) | 1.02 in. (26 mm.) |
| Width | MW (FIG. 8) | 1.65 in. (42 mm.) |
| Length | ML (FIG. 8) | 1.57 in. (40 mm.) |

The modular board camera housing 140 includes the upper portion 141 and the symmetrical lower portion 142. The upper and lower portions 141, 142 are advantageously identically shaped and positioned symmetrically about a part line 144 and define the interior region 146 (FIG. 9) in which components of the modular camera assembly 200 are supported. Since the upper and lower portions 141, 142 are symmetrical, only the construction of the lower portion 142 will be discussed with the understanding that the same construction and features are present in the mating upper portion 141. Fabrication and assembly of the modular camera assembly 200 is simplified because the housing portions 141, 142 are interchangeable and, therefore, only one configuration needs to be fabricated.

As can best be seen in FIGS. 9, 12, 13a and 13b, the housing lower portion 142 includes a substantially flat base 150 and three side walls 152, 154, 156 extending perpendicularly from the base 150. An inner surface of the side wall 152 includes two spaced apart slots 160a, 162a extending from an upper edge 164 of the housing lower portion 142 defined by the side walls 152, 154, 156 to an inner surface 166 of the base 150. Similarly, an inner surface of the side wall 156 includes matching spaced apart slots 160b, 162b extending from the upper edge 164 of the housing lower portion 142 to the inner surface 166 of the base 150.

The modular camera assembly 200 includes circuitry 201 mounted on a set of two parallel, spaced apart front and rear printed circuit boards 210, 214 affixed to a spacer element 215 (FIGS. 9 and 11). The slots 162a, 162b receive and securely hold the rear printed circuit board 214 (FIG. 11) while the slots 160a, 160b receive the front printed circuit board 210. Mounted on a front surface 212 of the front printed circuit board 210 is the photosensor array IC chip 206. The optic assembly 300 must be precisely aligned with the photosensor array 202 to insure proper imaging of the imaging target area 104. Spring-like projections 170a, 170b (FIGS. 9 and 12) extend upwardly from the base inner surface 166. As can best be seen in FIG. 12, the projections 170a, 170b are spaced from their respective side walls 152, 156 but are still within regions defined by the slots 160a, 160b.

Figure 12:
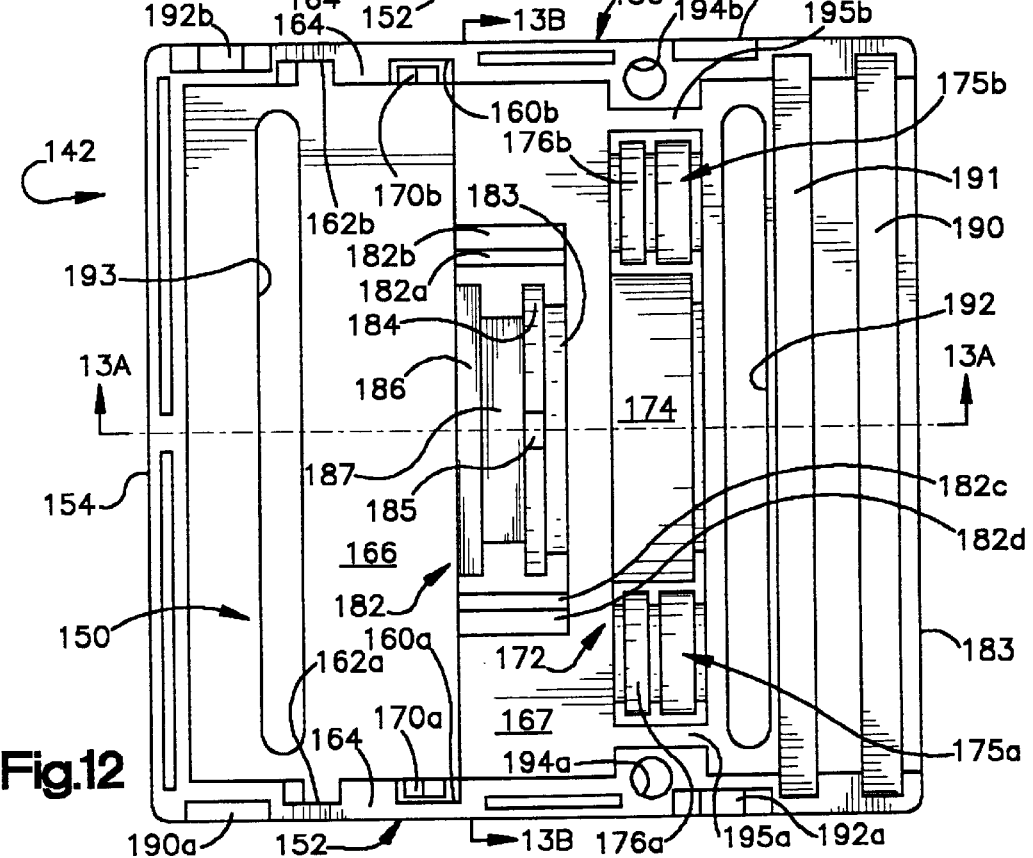
FIG. 12 is a top plan view of a lower half of the modular camera assembly housing as seen in FIG. 11 with the modular camera assembly components removed.
Figure 13A:
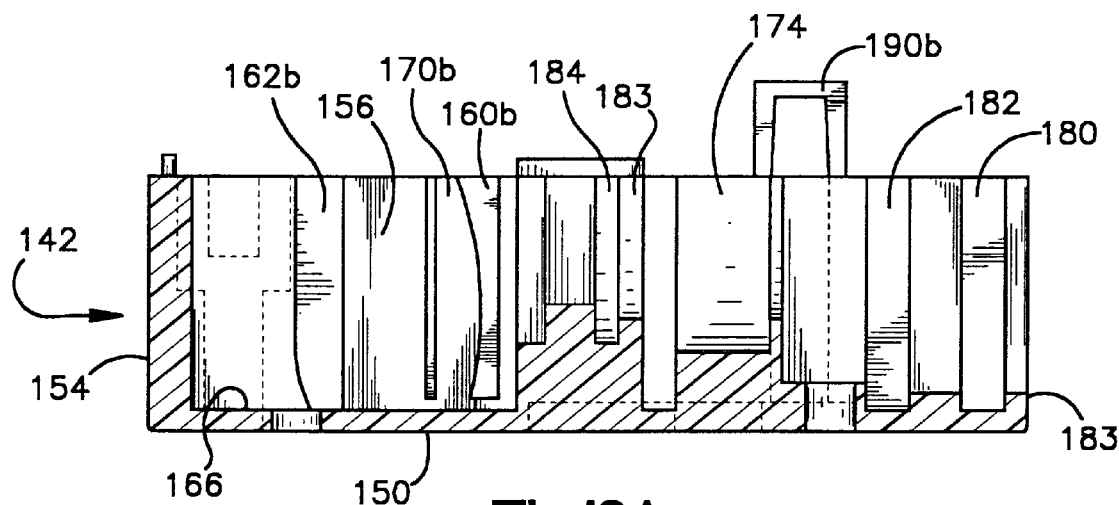
FIG. 13A is a sectional view of the lower half of the modular camera assembly housing as seen from a plane indicated by the line 13A—13A in FIG. 12.

When the printed circuit boards 210, 214 are inserted in their respective slots 162a, 162b, 160a, 160b, the projections 170a, 170b flex and push in a horizontal direction against a back side 213 (FIG. 11) of the printed circuit board 210 in a direction labeled F to insure the boards 210, 214 are securely held in place and the photosensor array 202 is precisely located. Additionally, as can be seen in FIGS. 12 and 13A, the slots 162a, 162b are tapered adjacent the base inner surface 166. The slots 162a, 162b become narrower near the base 150 thereby forcing the printed circuit board 214 in the direction F. The taper of the slots 162a, 162b combined with the projections 170a, 170b in the slots 160a, 160b apply sufficient force to the printed circuit boards 210, 214 so as to eliminate any "play" of the front and rear printed circuit boards 210, 214 in their respective slots.

The housing lower portion 142 also includes first and second supports 172, 182 extending upwardly from a slightly raised portion 167 (FIG. 12) of the base inner surface 166. As can best be seen in FIGS. 9, 11 and 12, the first support 172 includes a central portion 174 with a semicircular recess flanked by two outerlying portions 175a, 175b having smaller semicircular recesses. The central portion 174 supports the outer shroud 342 of the optic assembly 300. The two smaller outerlying portions support respective targeting light emitting diodes 473a, 473b of the targeting illumination assembly 450. The targeting LEDs 464a, 464b are cylindrically shaped and include enlarged diameter base portions 465a, 465b (best seen in FIGS. 9 and 11) which fit into inwardly stepped semicircular recesses 176a, 176b of the outerlying portions 175a, 175b. A first end portion 183 of the second support 182 includes a semicircular recess which supports the outer shroud 342.

Just inward of the end portion 183 is a portion 184 (FIGS. 12 and 13A) defining another semicircular recess having a slightly larger diameter than the recess of the end portion 183. The portion 184 is sized to receive the outwardly flared end portion 343 (FIG. 15) of the outer shroud 342 and thereby position it precisely with respect to the photosensor array 202. The outwardly flared end portion 343 of the outer shroud 342 includes two small cut out portions 354 (only one of which can be seen in FIG. 9). One of the cut out portions 354 fits onto a raised nub 185 (FIG. 12) of the semicircular shaped portion 184 to prevent the outer shroud 342 from rotating within the housing 140. The other of the cut out portions 354, of course, fits onto an identical nub (not shown) of the upper housing portion 141 which is identical in shape and configuration to the lower housing portion 142.

Figure 13B:
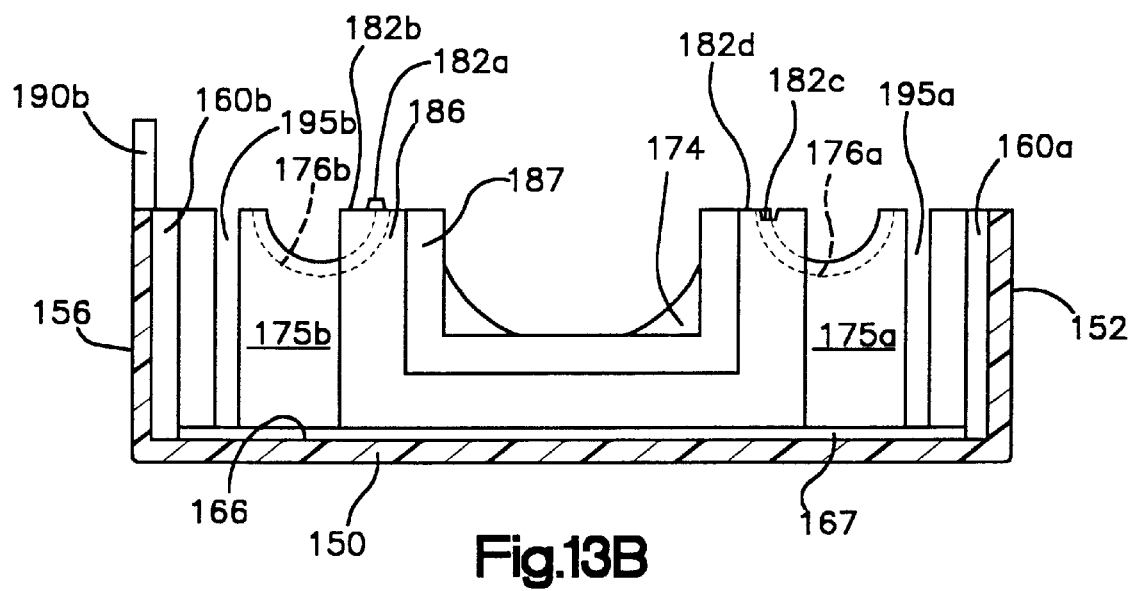
FIG. 13B is another sectional view of the lower half of the modular camera assembly housing as seen from a plane indicated by the line 13B—13B in FIG. 12.

As can best be seen in FIG. 13B, a second end portion 186 of the second support 182 includes a rectangular shaped recess. Disposed between the second end portion 186 and the portion 184 is a portion 187 (FIGS. 12, 13A and 13B) defining a rectangular shaped recess that is slightly smaller size than the recess defined by the end portion 186. As can be seen in FIG. 11, the recess of the portion 184 receives an extending portion of the photosensor array IC chip support 208. The photosensor array chip support 208 is mounted to the front surface 212 of the printed circuit board 210. The front surface 212 of the printed circuit board 210 abuts the second support end portion 186 and, thus, the light receiving surface 204 of the photosensor array 202 is precisely positioned with respect to the support and with respect to the optic assembly 300 both in terms of a distance between the lens L5 of the optic assembly and photosensor array 202 and the perpendicularity between a longitudinal axis through the lenses L1, L2, L3, M4 and the light receiving surface 204 of the photosensor array 202. The light receiving surface 202 is coincident with the image plane of the optic assembly 300.

The shroud assembly outer shroud 342 and the second support 182 function to prevent ambient light from impinging on the photosensor array light receiving surface 204. When the housing upper and lower portions are 141, 142 are assembled, the second support 182 of the two portions encircle the outer shroud end 343 and the photosensor array light receiving surface 204.

As can be seen in FIGS. 9, 12 and 13B, a raised ledge 182a extends upwardly from an upper surface 182b of one side of the second support 182. A mating recess 182c is formed in an upper surface 182d of the opposite side of the second support 182. When the upper and lower housing portions 141, 142 are assembled, the raised ledge 182a of the lower housing portion 142 is received in a mating recess in an upper surface of a second support of the upper housing portion 140. The mating recess of the upper housing portion 141, of course, is identical to the recess 182c of the lower housing portion 142 as the portions 141, 142 are identical in configuration. Similarly, the mating recess 182c of the lower housing portion 142 receives a raised ledge of an upper surface of the second support of the upper housing portion. The raised ledge of the upper housing portion 141, of course is identical to the raised ledge 182a of the lower housing portion 142.

The interlocking of the respective raised ledges 182a and mating recesses 182c of the second supports 182 of the housing upper and lower portions 141, 142, insure the area between the end 434 of the shroud assembly 302 and the photosensor array support 208 is light tight. In addition to preventing ambient light from impinging on the photosensor array 202, the second support 182 of the housing upper and lower portions 141, 142 support the shroud assembly 302 and insure that the optical axis A—A through the centers of the lenses L1, L2, L3, L4 and the pinhole aperture A1 of the spacer member SP1 is perpendicular to the light receiving surface 204 of the photosensor array 202 and is also aligned with the center point CP of the photosensor array 202.

The housing lower portion 142 includes two unshaped latches 190a, 190b extending upwardly from the upper edge 164 of the respective side walls 152, 156 and two tapered detents 192a, 192b in recessed portions of the side walls 152, 156 that engage similar detents and latches of the upper portion 141 to seal the mating housing upper and lower portions 141, 142. As can be seen in FIG. 8, the two latches 190a, 190b engage respective detents in the housing upper portion 141 corresponding to the detents 192a, 192b of the housing lower portion 142. Similarly, the detents 192a, 192b are engaged by unshaped latches of the upper portion 141. The latches are flexible enough to deflect as they traverse their respective tapered detents and then snap into engagement position once the central openings of the detents pass the opposing detents.

The lower housing 142 includes two apertures 194a, 194b (FIGS. 11 and 12) which align with identical apertures of the housing upper portion 141 to facilitate affixing the modular housing 140 within the device housing extending snout 16. When the housing upper and lower portions 141, 142 are assembled, ventilation of the electronic components supported therein including the board camera assembly circuitry 201 and the targeting and illumination assembly 400 is provided by two elongated openings 192, 193 (FIG. 12).

Two slots 195a, 195b (as seen in FIGS. 12 and 13B) are disposed between the two outerlying portions 175a, 175b and portions of the side walls 152, 156 surrounding apertures 194a, 194b. One of the slots 195a, 195b provide a passageway for a plurality of conductive leads 196 (FIG. 11) extending between a conductor 470 affixed to a back side 460b of the circuit board 460 and a conductor 198 affixed to the front side 212 of the first circuit board 210 of the board camera assembly 200. The other of the slots provides a passage for an angled extending portion 463a (FIG. 18) of a flexible printed circuit board 463. The circuit board 463, typically referred to as "circuit on flex", electrically connects the leads 465c, 465d (FIG. 11) extending rearwardly from the targeting LEDs 464a, 464b with circuitry on the circuit board 460 to permit selective energization of the LEDs 464a, 464b to aid in aiming the device 100 at the target dataform 10. A front section 463b (FIGS. 9 and 11) of the flexible printed circuit board 463 is coupled to the circuitry on the circuit board 460 through an electrical connector 460c disposed on the back side 460b of the circuit board 460.

Image Processing of the Imaging Assembly 102

Figure 29B:
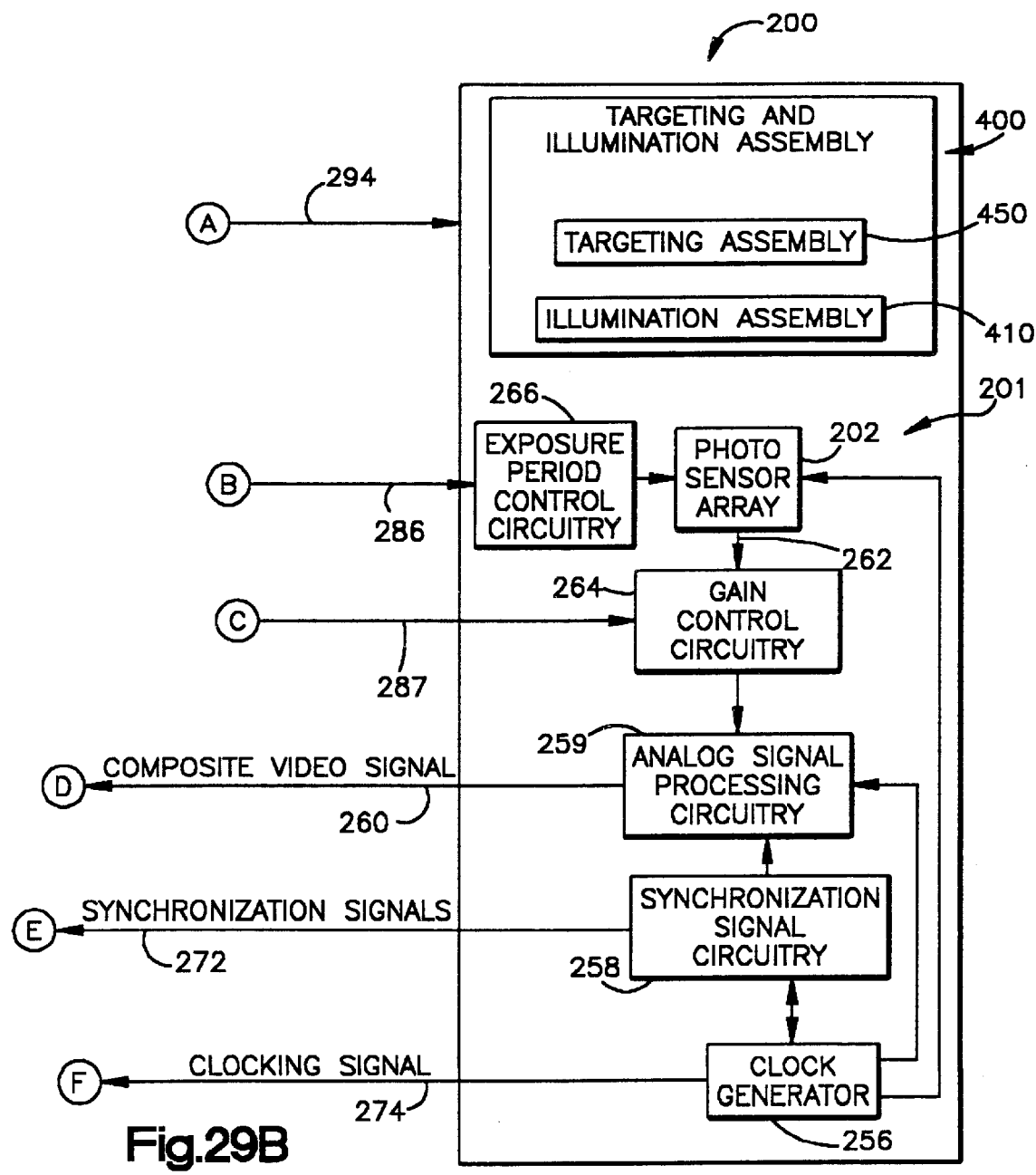
FIG. 29B is a second portion of a block diagram of selected circuitry of the portable data collection device of the present invention, the second portion matching the first portion shown in FIG. 29A.

In the preferred embodiment of the portable data collection device 100, the photosensor array 202 is part of the modular board camera assembly 200 commercially available from such vendors as Sharp or Sony of Japan. Referring to FIGS. 29A and 29B, the camera assembly 200, when activated, generates the composite video signal 260. As can be seen schematically in FIG. 29B, the board camera assembly 200 also includes a clock generator 256, synchronization signal circuitry 258 and analog signal processing circuitry 259 for reading illumination intensity values out of each photosensor of the photosensor array 202 and generating the composite video signal 260.

The intensity of light incident on individual pixels or photosensors of the photosensor array 202 varies somewhat uniformly from very bright (whitest areas of the image) to very dark (darkest areas of the image). The clock generator 256 is coupled to a crystal oscillator (not shown) and generates asynchronous clocking signals to read out charges accumulating on individual photosensors over an exposure period. The charges on the photosensors are read out through CCD elements (not shown) adjacent the photosensor array photosensors. The charges are converted to a voltage signal 262 (shown schematically in FIG. 29B) wherein temporal portions of the voltage signal represent the changes accumulated on each photosensor. One CCD element is provided for reading out the charges on two photosensors thus two read outs of the photosensor array comprise one full image frame, the frame being comprised of two interlaced fields.

The camera assembly 200 generates the composite analog video signal 260 corresponding to consecutive fields of the image incident on the photosensor array 202. The video signal 260 is termed "composite" because it includes synchronization signals generated by the synchronization signal circuitry 258 which correlate portions of the video signal to particular photosensors, interspersed among image signal portions wherein the signal magnitude represents charges on individual photosensors read out from a given row of the photosensor array 202.

The board camera assembly 200 also includes gain control circuitry 264 for controlling amplification of the voltage image signal 262 and exposure period control circuitry 266 (FIG. 29B) for controlling a duration of an exposure period of the pixels. Both the exposure period control circuitry 266 and the gain control circuitry 264 are controlled by exposure parameters control circuitry 268 (FIG. 29A) including fuzzy logic circuitry 270.

The synchronization signals 268 generated by synchronization signal circuitry 258, the clock signal 270, generated by the clock generator 256, and the composite video signal 260 are output to signal processing circuitry 276 (FIG. 29A) on the control and decoder board 252. Because the signal and image processing circuitry 250 and, particularly, the signal processing circuitry 276, is configured to receive a composite video signal, it should be appreciated that selection of the board camera assembly 200 and circuitry 201 for generating the composite video signal 260 are not critical to the present invention.

Under the control of the microprocessor 251 mounted on the control and decoder board 252, the video signal 260 is input to the signal processing circuitry 276 along with clocking signals 274 and synchronization signals 272. The signal processing circuitry 276 includes synchronization extractor circuitry which receives the clocking signals 274 and the synchronization signals 272 and generates signals which are coupled to analog to digital converter circuitry (A/D converter circuitry) 278 causing the A/D converter circuitry to periodically digitize the video signal 260. The A/D converter circuitry 278 includes an A/D converter generating an 8 bit value representing the illumination incident on a pixel of the array during an exposure period.

Direct memory access (DMA) control circuitry 280 receives the synchronization signals 272 and clock signals 274 and generates address signals 281 coupled to a frame buffer memory 282 to indicate a storage location for each value generated by the A/D converter circuitry 278. Data signals 283 representing the values generated by the A/D converter circuitry 278 are coupled to the frame buffer memory 282.

The microprocessor 251 also controls operation of control and selection circuitry 284 and image processing circuitry 285 which are mounted on the control and decoder board 252. Coupled to the control and selection circuitry 284 are the dataform read trigger circuit 126a which, in turn, is coupled to the dataform reading trigger 126.

The exposure parameters control circuitry 268 which outputs control signals 286, 287 to the exposure period control circuitry 266 and the gain control circuitry 264 of the camera assembly 200 and a reference voltage signal 288 embodying an appropriate set of reference voltages for operating the A/D converter 278. The exposure parameters control circuitry 268 includes the fuzzy logic circuitry 270 which analyzes captured frames of data accessed from the frame buffer memory 282. The fuzzy logic circuitry 270 analyzes a captured frame to determines if the current exposure period of the 2D photosensor array 202, the current amplification of the video signal 262 by the gain control circuitry 264 and the reference voltages used by the A/D converter circuitry 278 are resulting in an "acceptable" captured image frame. If not, the control signal 286 is changed to adjust the exposure period of the two dimensional photosensor array 202 and/or the control signal 287 is changed to adjust the amplification of the voltage signal 262 and/or the signal 288 is changed to adjust the operation of the A/D converter circuitry 278. After the adjustment, another captured frame is analyzed by the fuzzy logic circuitry 270 and, if necessary, further adjustments are made in an iterative fashion until the camera assembly 200 produces an "acceptable" captured image. A suitable exposure parameter control circuit including fuzzy logic control circuitry is disclosed in U.S. Pat. No. 5,702,059, issued Dec. 30, 1997, which has previously been referenced.

The frame buffer memory 282 is provided to store digital gray scale values (represented by line 283 in FIG. 29A) generated by the A/D converter circuitry 278 from the composite video signal 260. The gray scale values are processed by image processing circuitry 285. The image processing circuitry 285 includes binarization and zoning circuitry 289, rotation correction circuitry 290, cell extraction circuitry 291 and decoding circuitry 292. The binarization and zoning circuitry 289, rotation correction circuitry 290, cell extraction circuitry 291 and decoding circuitry 292 operate under the control of the microprocessor 251 as disclosed in U.S. application Ser. No. 08/961,096, filed Oct. 30, 1997 and entitled "Portable Data Collection Device with Binarization Circuitry." application Ser. No. 08/961,096 is assigned to the assignee of the present invention and is incorporated in its entirety herein by reference.

As can be seen in FIGS. 14 and 29A, the power source 124 is coupled to the control and decoder board 252 to provide operating power to the microprocessor 251 and other circuitry mounted on the board and the radio module 134 operating under the control of the microprocessor 251. Power circuitry 293, also operating under the control of the microprocessor 251, is coupled through a lead 294 to the targeting and illumination assembly 400 and the circuitry 201 of the board camera assembly 200 to supply power to these components of the imaging assembly 102.

As can best be seen in FIGS. 29A and 29B, the imaging assembly 102 includes the board camera assembly 200 which is electrically coupled to the control and decoder board 252. The control and decoder board 252 includes the microprocessor 251 and associated circuitry. The circuitry of the imaging assembly 102 may by embodied in software resident in one or more RAM or ROM memory chips (not shown) mounted on the control and decoder board 252 and operated by the microprocessor 251. Alternately, the circuitry of the imaging assembly 102 may comprise separate application-specific integrated circuitry (ASIC) mounted on the control and decoder board 252.

Decoded dataform data may be stored in the frame buffer memory 282 for later downloading via the serial port 138 via serial output circuitry 296 and a buffer memory 297 or transmitted to the radio module 134 for rf communication to a remote host computer (not shown).

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclose comprise preferred forms of putting the invention into effect. The invention is, therefore, claimed in any of its forms or modifications within the proper scope of the appended claims appropriately interpreted in accordance with the doctrine of equivalents.

What is claimed is:

1. A dataform reader for a portable data collection device, the dataform reader adapted to image and decode a dataform, the dataform reader comprising:
   a) an illumination assembly including an illumination source energizable to direct strobing illumination of a first range of wavelengths toward an imaging target area of the dataform reader for illuminating a target dataform positoned within the imaging target area such that the illuminated dataform emits an illumination pattern corresponding to an image of the target dataform, the illumination pattern having a second range of wavelengths and wherein the first and the second ranges of wavelengths are mutually exclusive;
   b) a two dimensional imaging assembly including a two dimensional photosensor array, the two dimensional imaging assembly actuatable to generate a signal representative of the image of the target dataform positioned in the imaging target area;
   c) the two dimensional imaging assembly including signal and image processing circuitry for processing and decoding the signal representative of the image of the target dataform positioned in the imaging target area;
   d) an optic assembly positioned with respect to the imaging target area to focus the emitted illumination from the target dataform onto the photosensor array and including a filter permitting illumination in the second range of wavelengths to be focused onto the photosensor array and preventing illumination in the first range of wavelengths from being focused onto the photosensor array; and
   e) control and selection circuitry electrically coupled to the imaging assembly and the illumination assembly to selectively actuate the imaging assembly and selectively energize the illumination source to image and decode the target dataform.

2. The dataform reader of claim 1 wherein the illumination source comprises a flash tube emitting strobing illumination when energized.

3. The dataform reader of claim 2 wherein the flash tube emits strobing illumination including illumination in the first and second range of wavelengths and the illumination source further includes a filter overlying the flash tube to permit illumination in the first range of wavelengths to be directed toward the imaging target area and preventing illumination in the second range of wavelengths from being directed toward the imaging target area.

4. The dataform reader of claim 1 wherein the first range of wavelengths corresponds to wavelengths in an ultraviolet range of an electromagnetic spectrum.

5. The dataform reader of claim 3 wherein the flash tube emits strobing illumination at a rate of between three and seven flashes per second.

6. The dataform reader of claim 1 wherein the first range of wavelengths has a spectral output centered about a wavelength of substantially 370 nanometers.

7. The dataform reader of claim 1 wherein the second range of wavelengths corresponds to wavelengths in a visible light range of an electromagnetic spectrum.

8. The dataform reader of claim 1 wherein the second range of wavelengths has a spectral output substantially centered about a range of wavelengths between 580 and 605 nanometers.

9. The dataform reader of claim 1 wherein the illumination assembly further includes a targeting illumination assembly electrically coupled to the control and selection circuitry, the control and selection circuitry periodically energizing and deenergizing the targeting illumination assembly to provide targeting illumination to aid in aiming the device at a dataform.

10. The dataform reader of claim 9 wherein the targeting illumination assembly is deenergized when the illumination source is energized.

11. A portable data collection device comprising:
   a) a housing defining an interior region; and
   b) a dataform reader assembly at least partially supported within the housing interior region, the dataform reader assembly adapted to image and decode a target dataform disposed within a target area of the dataform reader assembly, the target dataform being illuminated by strobing illumination having a first range of wavelengths thereby emitting an illumination pattern corresponding to an image of the dataform to be imaged and decoded, the emitted illumination pattern having a second range of wavelengths, the first and second ranges of wavelengths being mutually exclusive, the dataform reader assembly including:
      1) a two dimensional imaging assembly including a two dimensional photosensor array, the two dimensional imaging assembly actuatable to generate a signal representative of an image of the dataform reader target area, the target area image including the image of the target dataform resulting from the illumination pattern emitted by the target dataform;
      2) the two dimensional imaging assembly including signal and image processing circuitry for processing and decoding portions of the signal representative of the image of the target dataform;

3) an optic assembly positioned with respect to the dataform reader target area to focus the target area image onto the photosensor array and including a filter permitting illumination in the second range of wavelengths to be focused onto the photosensor array and preventing illumination in the first range of wavelengths from being focused onto the photosensor array;

4) an illumination assembly including a illumination source energizable to generate strobing illumination in the first range of wavelengths and being positioned to illuminate the target area with strobing illumination in the first range of wavelengths when actuated for illuminating the target dataform positioned within the imaging target area such that the illuminated dataform emits the illumination patter corresponding to the image of the target dataform; and 5) control and selection circuitry electrically coupled to the imaging assembly and the illumination assembly to selectively actuate the imaging assembly and selectively energize the illumination source to image and decode the target dataform.

12. The portable data collection device of claim 11 wherein the first range of wavelengths corresponds to wavelengths in an ultraviolet range of an electromagnetic spectrum.

13. The portable data collection device of claim 12 wherein the first range of wavelengths has a spectral output centered about a wavelength of substantially 370 nanometers.

14. The portable data collection device of claim 11 wherein the illumination source comprises a flash tube emitting strobing illumination when energized.

15. The portable data collection device of claim 14 wherein the illumination source emits strobing illumination including illumination in the first and second range of wavelengths and the illumination source further includes a filter to permit illumination in the first range of wavelengths to be directed toward the target area and preventing illumination in the second range of wavelengths from being directed toward the target area.

16. The portable data collection device of claim 14 wherein the flash tube emits strobing illumination at a rate of between three to seven flashes per second.

17. The portable data collection device of claim 11 wherein the second range of wavelengths has a spectral output substantially centered about a range of wavelengths between 580 and 605 nanometers.

18. The portable data collection device of claim 11 wherein the two dimensional photosensor array, the optic assembly and the illumination assembly are supported by a modular housing defining the interior region, the photosensor array being supported within the interior region.

19. The Portable data collection device of claim 11 wherein the illumination assembly further includes a targeting illumination assembly electrically coupled to the control and selection circuitry, the control and selection circuitry periodically energizing and deenergizing the targeting illumination assembly to provide targeting illumination to aid in aiming the device at a dataform.

20. The portable data collection device of claim 19 wherein the targeting illumination assembly is deenergized when the illumination source is energized.

* * * * *

UNITED STATES PATENT AND TRADEMARK OFFICE
CERTIFICATE OF CORRECTION

PATENT NO.: 6,123,263
DATED: September 26, 2000
INVENTOR(S): Chen Feng

It is certified that error appears in the above-identified patent and that said Letters Patent is hereby corrected as shown below:

Title page,

"[73] Assignee: Meta Holdings Corporation, Akron, Ohio" should read --[73] Assignee: Meta Holding Corporation, Akron, Ohio--

Signed and Sealed this

First Day of May, 2001

Attest:

NICHOLAS P. GODICI

Attesting Officer

Acting Director of the United States Patent and Trademark Office